US006044546A

United States Patent [19]

Yoshie

[11] Patent Number: 6,044,546

[45] Date of Patent: Apr. 4, 2000

[54] APPARATUS FOR CLIPPING A SHEET MEMBER

[75] Inventor: Toru Yoshie, Tokyo, Japan

[73] Assignee: Max Co., Ltd., Tokyo, Japan

[21] Appl. No.: 08/952,601

[22] PCT Filed: Mar. 21, 1997

[86] PCT No.: PCT/JP97/00949

§ 371 Date: Nov. 24, 1997

§ 102(e) Date: Nov. 24, 1997

[87] PCT Pub. No.: WO97/35800

PCT Pub. Date: Oct. 2, 1997

[30] Foreign Application Priority Data

| | | | |
|---|---|---|---|
| Mar. 22, 1996 | [JP] | Japan | 8-65924 |
| Apr. 2, 1996 | [JP] | Japan | 8-80024 |
| Apr. 5, 1996 | [JP] | Japan | 8-83610 |
| Apr. 5, 1996 | [JP] | Japan | 8-83611 |
| Apr. 8, 1996 | [JP] | Japan | 8-84978 |
| Aug. 26, 1996 | [JP] | Japan | 8-224060 |
| Aug. 28, 1996 | [JP] | Japan | 8-226275 |
| Oct. 21, 1996 | [JP] | Japan | 8-277848 |
| Nov. 27, 1996 | [JP] | Japan | 8-315983 |
| Nov. 27, 1996 | [JP] | Japan | 8-316428 |

[51] Int. Cl.[7] .............................. B23Q 15/00; B23P 11/00

[52] U.S. Cl. ................................ 29/707; 29/715; 29/818; 29/243.56; 270/58.08; 412/34

[58] Field of Search .............................. 29/243.5, 243.56, 29/243.58, 509, 816, 817, 709, 714, 715, 809, 707, 818; 412/34; 270/58.08, 58.09

[56] References Cited

U.S. PATENT DOCUMENTS

| | | | |
|---|---|---|---|
| 1,743,319 | 1/1930 | Cave et al. | 29/243.56 |
| 2,886,816 | 5/1959 | Hill | 29/243.56 |
| 3,055,010 | 9/1962 | Maestri | 29/243.56 |
| 3,810,495 | 5/1974 | Pack . | |
| 3,903,580 | 9/1975 | Lam | 29/243.56 |
| 4,208,750 | 6/1980 | Pfaffle | 29/243.56 |
| 4,934,890 | 6/1990 | Flatt | 412/34 |
| 5,020,355 | 6/1991 | Payne et al. | 29/243.56 |
| 5,106,066 | 4/1992 | Shea et al. | 270/58.08 |
| 5,187,534 | 2/1993 | Iwata et al. | 270/58.08 |
| 5,269,503 | 12/1993 | Hiroi et al. | 270/58.08 |
| 5,662,318 | 9/1997 | Harada et al. | 270/58.08 |

FOREIGN PATENT DOCUMENTS

| | | | |
|---|---|---|---|
| 259552 | 5/1963 | Australia | 29/809 |
| 533032 | 11/1956 | Canada | 29/784 |
| 1138140 | 6/1957 | France | 29/243.58 |
| 654919 | 6/1963 | Italy | 412/34 |
| 1208204 | 10/1970 | United Kingdom | 29/243.56 |

*Primary Examiner*—David P. Bryant

*Attorney, Agent, or Firm*—Jacobson, Price, Holman & Stern, PLLC

[57] ABSTRACT

A clipping apparatus is provided which comprises a cartridge (100) for containing a plurality of substantially flat clipping members arranged in a pile, a delivery mechanism (30) for taking out one of the clipping members contained in the cartridge (100) and delivering the clipping member to a clipping position (13) where an end of a sheet member is clipped, and a clamping mechanism (50) for bending the clipping member (105) delivered to the clipping position (13) and fastening the end of the sheet member (S) inserted in the clipping position (13) with the clipping member (105) while holding both ends of the clipping member (105).

8 Claims, 44 Drawing Sheets

APPARATUS FOR CLIPPING A SHEET MEMBER

BACKGROUND OF THE INVENTION

1. Field of the Invention

This invention relates to a method of and an apparatus for fastening an end of a sheet member with a clip.

2. Description of the Prior Art

Conventionally, a clipping machine is known for fastening an end of a sheet member with a clip (see Japanese Utility Model Application Laid-Open Publication No. Sho 47-12089).

The conventional clipping machine comprises, as shown in FIGS. 63 and 64, a base 1, a handle 2 attached pivotably to an end of the base 1, and a cover 3 disposed between the base 1 and the handle 2. A guiding groove 4 is formed in the upper surface of the base 1, and a row of connected clipping members 5 are contained between the guiding groove 4 and the cover 3. The connected clipping members 5 consist of clipping members 5N which are connected to each other with an adhesive agent like a sheet of staples. Each clipping member 5N is bent into a U-shape.

An end (rear end) of the connected clipping members 5 is in contact with a metallic member 7 which is slidably attached to a pressing rod 6 shown in FIG. 65. The connected clipping members 5 are pressed leftward (in FIG. 64) by the force of a spring 9 via the metallic member 7. The force enables the other end (front end) of the connected clipping members 5 to come into contact with an end 4*a* of the groove 4.

A pressing plate 8 is attached to the underside of the handle 2. When the handle 2 is pivoted from the position shown by the solid line to that shown by the chain line in FIG. 63, the pressing plate 8 comes into contact with the bent base part of the clipping member 5N occupying the front row of the connected clipping members 5, so that the clipping member 5N is separated from the connected clipping members 5. Then, only the separated clipping member 5N is further pressed and deformed by the pressing plate 8, and thereby an end of a plurality of sheets of paper inserted in the direction of arrow P is clipped by the clipping member 5N.

In order to perform a precise clipping operation by means of the clipping member 5N, the width of the clipping member 5N is required to be made larger. However, as a result of enlarging the clipping member 5N, the number of the clipping members 5N which can be contained in the apparatus is reduced. Therefore, disadvantageously, the apparatus must be frequently replenished with connected clipping members 5, and thus more labor is required.

SUMMARY OF THE INVENTION

In view of the aforementioned disadvantage, the present invention was made. It is therefore an object of the present invention to provide a method of and an apparatus for clipping a sheet member, in which the number of clipping members to be contained can be increased even though the width of a clipping member is larger.

In order to achieve the object, a sheet member clipping method according to an aspect of the present invention comprises the steps of keeping a plurality of platelike clipping members in a containing chamber, thereafter picking out one of the clipping members contained in the containing chamber, and bending the picked-out clipping member and clipping an end of a sheet member.

A clipping apparatus according to an aspect of the present invention comprises a containing chamber containing a plurality of substantially flat clipping members arranged in a pile, a delivery means for picking out of the containing chamber one of the clipping members contained in the containing chamber and delivering the clipping member to a clipping position where a clipping operation is performed, and a clamping means for bending the clipping member delivered to the clipping position and clipping an end of a sheet member inserted in the clipping position.

According to another aspect of the present invention, in a clipping apparatus in which a substantially flat clipping member is picked out of a containing chamber containing a plurality of clipping members arranged in a pile by a delivering means and is delivered to a clipping position where a clipping operation is performed, the clipping member delivered to the clipping position is then bent by a clamping means, and an end of a sheaf of sheets inserted in the clipping position is clipped, the clipping apparatus comprises a driving means for driving the delivering means, a driving cam for actuating the clamping means while rotating interrelatedly with the movement of the driving means, and a sheet-thickness adjusting means for preventing the driving cam from stopping the rotation when the clamping means stops operating midway because of the sheaf of sheets being too thick.

In a clipping apparatus according to still another aspect of the present invention, a substantially flat clipping member is picked out of a containing chamber containing a plurality of clipping members arranged in a pile by a delivering means and is delivered to a clipping position where a clipping operation is performed, the clipping member delivered to the clipping position is then bent by a clamping means, and an end of a sheaf of sheets inserted in the clipping position is clipped. The delivering means includes a slider for delivering the clipping member to the clipping position in a state of being in contact with the middle part of the front surface of the clipping member, a stopping means for stopping the slider temporarily at the clipping position when the clipping member is delivered to the clipping position by the slider, and a retreating means for allowing the slider to retreat from the clipping position when the clipping member begins to be bent by the clamping means. The clamping means includes a pair of clamping members for pressing and bending the clipping member onto the slider while holding both ends of the clipping member delivered to the clipping position by a closing operation when the slider is at a temporary stop by the stopping means at the clipping position. In the clipping apparatus, when the slider is allowed to retreat from the clipping position by the retreating means, the clamping members further bend the clipping member by the closing operation, and thus the end of the sheaf of sheets is clipped.

According to the present invention, one of the plurality of clipping members contained in the containing chamber is picked out, and the clipping member is bent to clip the end of the sheet member.

Further, according to the present invention, the delivering means picks out one of the plurality of substantially flat clipping members contained in the containing chamber and delivers the clipping member to the clipping position where the clipping operation is performed, and the clamping means bends the clipping member so as to clip the end of the sheet member.

Further, according to the present invention, the delivering means driven by the driving means picks the clipping member out of the containing chamber and delivers the clipping member to the clipping position, and thereafter the driving cam actuates the clamping means interrelatedly with the operation of the driving means, and the clamping means bends the clipping member delivered to the clipping position so as to clip the end of the sheet member. In the middle of bending the clipping member, the sheet-thickness adjusting means prevents the driving cam from stopping rotation when the clamping means stops operating midway because of the sheaf of sheets being too thick.

Further, according to the present invention, the clipping member is delivered to the clipping position in a state where the slider is in contact with the middle part of the front surface of the clipping member, and the stopping means stops the slider temporarily at the clipping position. Thereafter, the clamping members press and bend the clipping member at the clipping position onto the slider, and then the retreating means allows the slider to retreat from the clipping position when the clipping member begins to be bent, and thereafter the clamping members further bend the clipping member by a closing operation so as to clip the end of the sheaf of sheets.

DETAILED DESCRIPTION OF THE PREFERRED EMBODIMENTS

Figure 1:
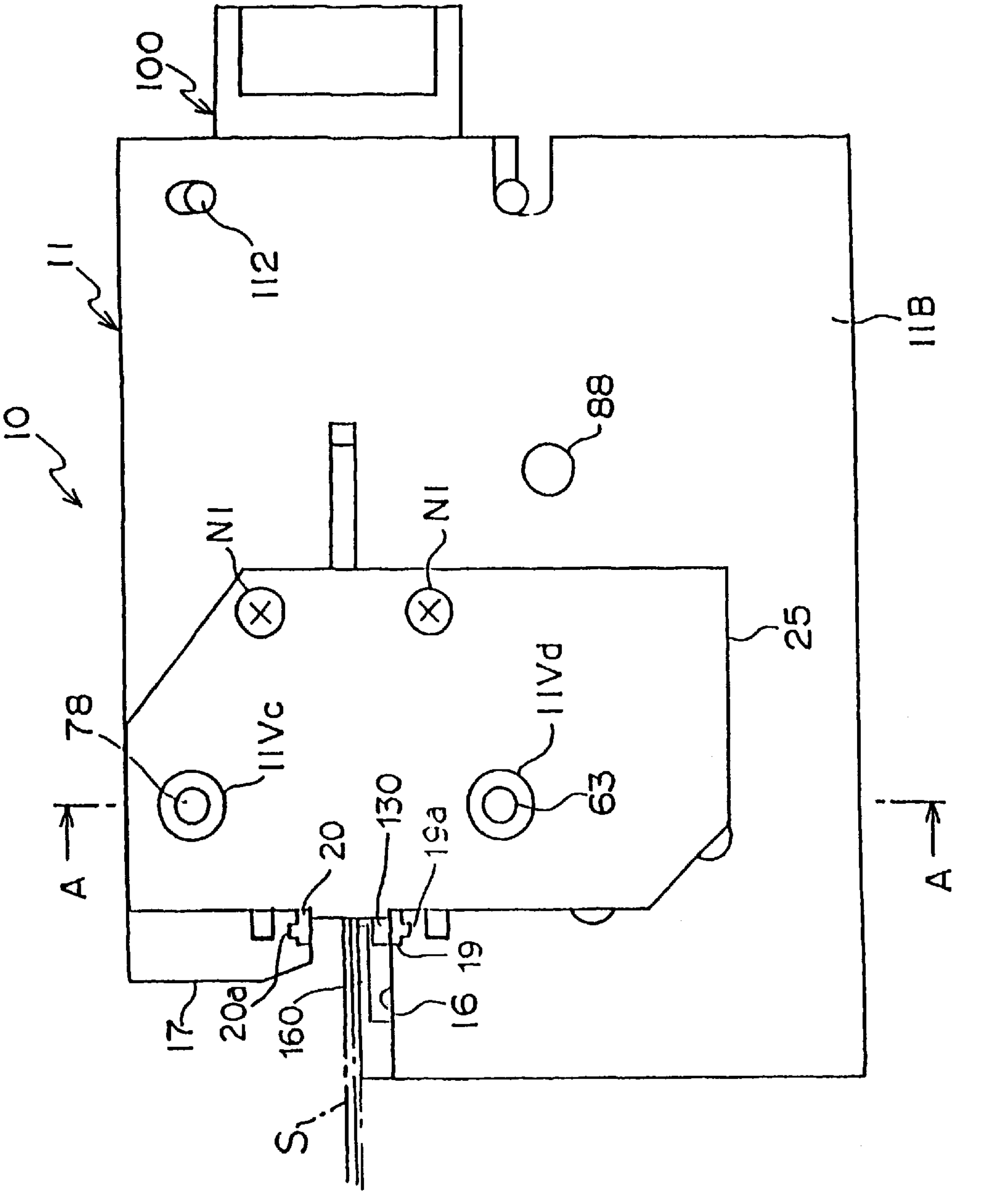
FIG. 1 is a side view showing the exterior appearance of a clipping apparatus according to the present invention.

Embodiments of a clipping apparatus according to the present invention will be hereinafter described with reference to the accompanying drawings.

Embodiment 1

In FIGS. 1 to 6, reference character 10 designates a clipping apparatus attached to, for example, a copying machine. The clipping apparatus 10 comprises a housing 11, a cartridge 100 which is detachably attached to a cartridge chamber (a containing chamber) 12 of the housing 11, a delivering mechanism (delivering means) 30 for delivering a platelike clipping member 105 (see FIG. 15) disposed inside the cartridge 100 to a clipping position 13 where a clipping operation is performed, a clamping mechanism (clamping means) 50 for bending the clipping member 105 delivered to the position 13, and a driving mechanism (driving means) 80 for driving the delivering mechanism 30 and the clamping mechanism 50.

[HOUSING]

Figure 9:
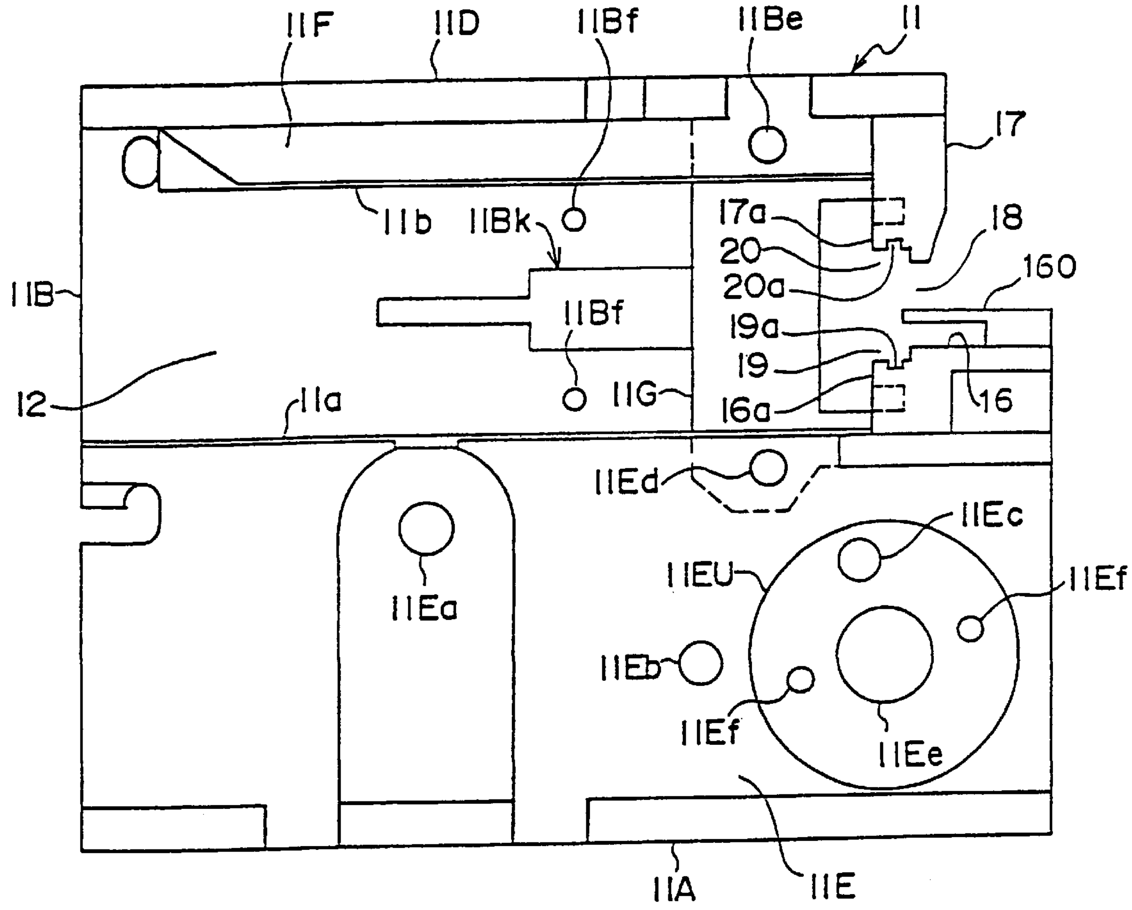
FIG. 9 is a sectional view of the housing, taken along line C—C in FIG. 8.
Figure 10:
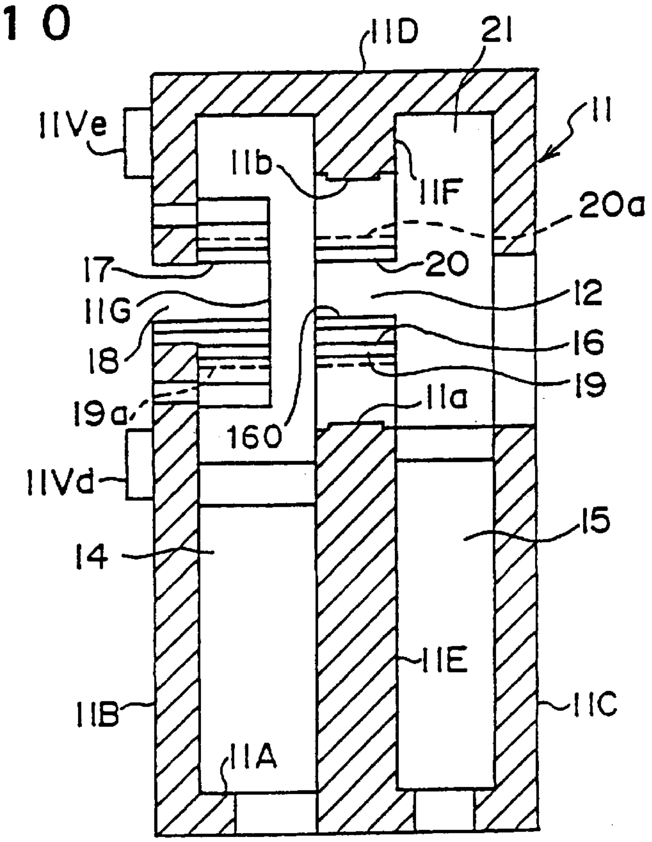
FIG. 10 is a sectional view of the housing, taken along line B—B in FIG. 7.

As shown in FIGS. 7 to 10, the housing 11 includes a bottom plate 11A, side walls 11B, 11C formed on both sides of the bottom plate 11A, a top plate 11D formed integrally with the upper part of the side walls 11B, 11C, a partition wall 11E which extends upward from the middle of the bottom plate 11A and also extends rightward and leftward therefrom (in FIG. 9). In the housing 11, a drive chamber 14 is defined between the partition wall 11E and the side wall 11B, and a clamp chamber 15 is defined between the partition wall 11E and the side wall 11C. Reference character 11G designates an auxiliary wall which makes a connection between the side wall 11B and the partition wall 11E and extends to the top plate 11D. The housing 11 also has an opening in the back part (i.e., the right side in FIG. 7).

A projecting wall 11F which extends in the right and left directions (in FIG. 9) and faces the partition wall 11E is formed on the under surface of the top plate 11D, and the space between the projecting wall 11F and the partition wall 11E is occupied by the cartridge chamber 12. Projecting portions 11*a*, 11*b* for holding the cartridge 100 are formed in the upper surface of the partition wall 11E and in the under surface of the projecting wall 11F, respectively.

In the partition wall 11E, there are formed shaft holes 11E*a* to 11E*e* and a circular concave portion 11EU into which an end of a driving motor 81 (mentioned later and shown in FIG. 3) is inserted. Reference character 11E*f* designates screw holes through which the driving motor 81 is attached to the partition wall 11E.

In the side wall 11B, there are formed an opening 11B*k* to which an arm 32 (mentioned later) is attached, shaft holes 11B*a* to 11B*e*, and screw holes 11B*f*. The shaft hole 11B*d* is connected to the shaft hole 11E*d* of the partition wall 11E through the auxiliary wall 11G. The shaft hole 11B*e* penetrates the auxiliary wall 11G and the projecting wall 11F. Reference characters 11V*d*, 11V*e* designate bosses having the shaft holes 11B*d*, 11B*e*, respectively.

The housing 11 is provided with a table-receiving portion 16 including a table 160 on which an end of a plurality of sheets S is placed and an upper-front wall portion 17 above the table-receiving portion 16 in the front part thereof. An opening 18 connected to the cartridge chamber 12 is defined between the table-receiving portion 16 and the upper-front wall portion 17. Concave portions 19, 20 extending in the right and left directions (in FIG. 8) are formed at the back of the table-receiving portion 16 and in the under surface of the upper-front wall portion 17, respectively. Engagement grooves 19*a*, 20*a* which extend in the right and left directions (in FIG. 8) and through which a slider 34 (mentioned later and shown in FIG. 4) is guided are formed in the concave portions 19, 20, respectively.

A rectangular opening 21 whose longer sides are positioned in the perpendicular direction and which is connected to the clamp chamber 15 is defined on the left side (in FIG. 8) of the front of the housing 11. The opening 21 is connected to the opening 18. The middle of the opening 21 is arranged to be the clipping position 13.

A concave portion 22 is formed in a front end surface 11C*a* of the side wall 11C. A bottom surface 22*a* of the concave portion 22 is flush with the upper surface of the table 160, and a side surface 22*b* of the concave portion 22 functions as a contact surface which comes into contact with an end of the sheets S to position the sheets S.

Figure 11A:
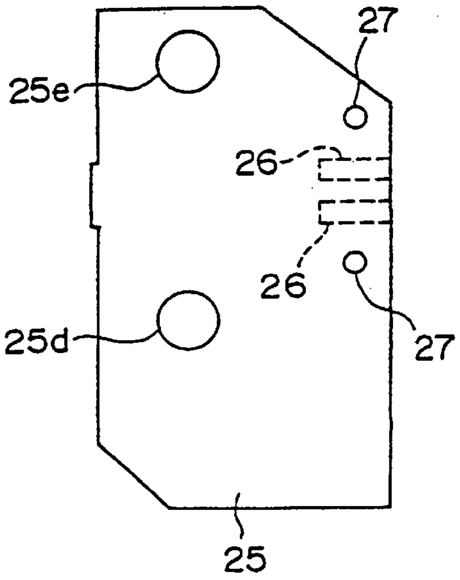
FIG. 11(A) is a front view of a cover plate.
Figure 11B:
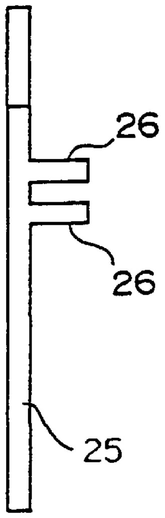
FIG. 11(B) is a side view of the cover plate.
Figure 12:
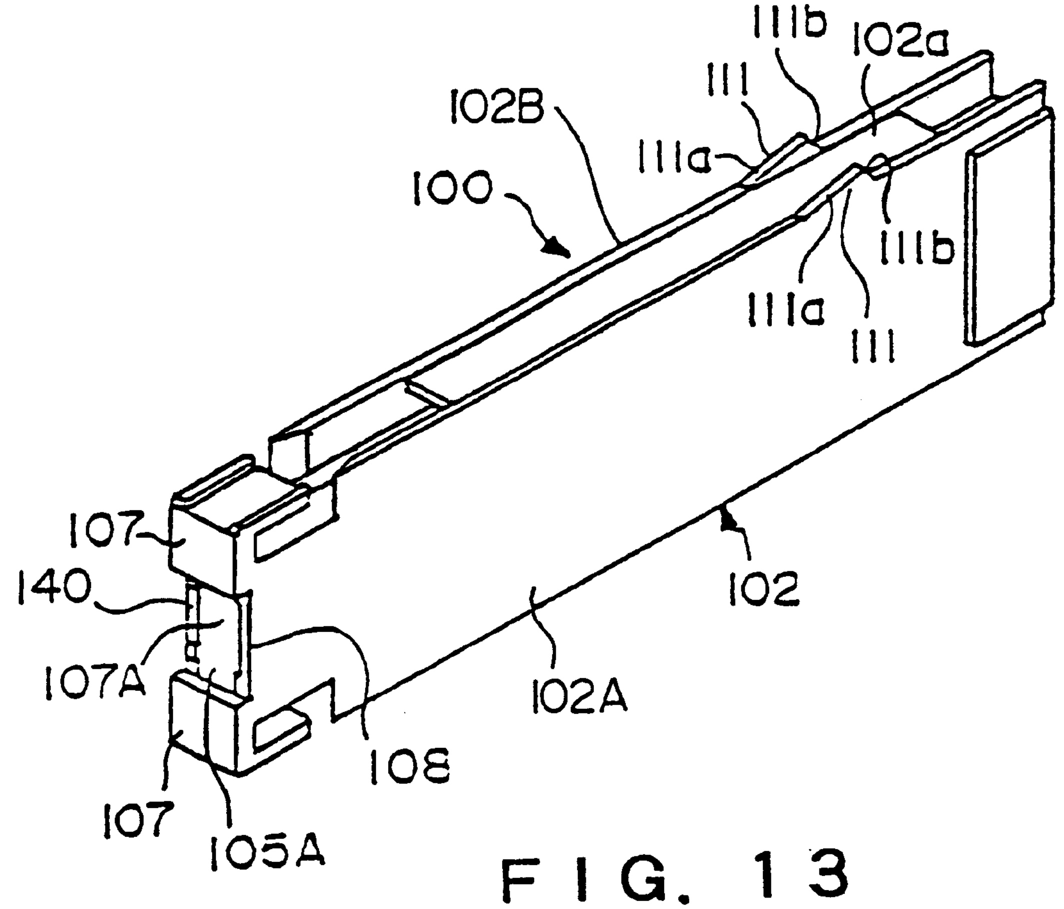
FIG. 12 is a perspective view of a cartridge.
Figure 13:
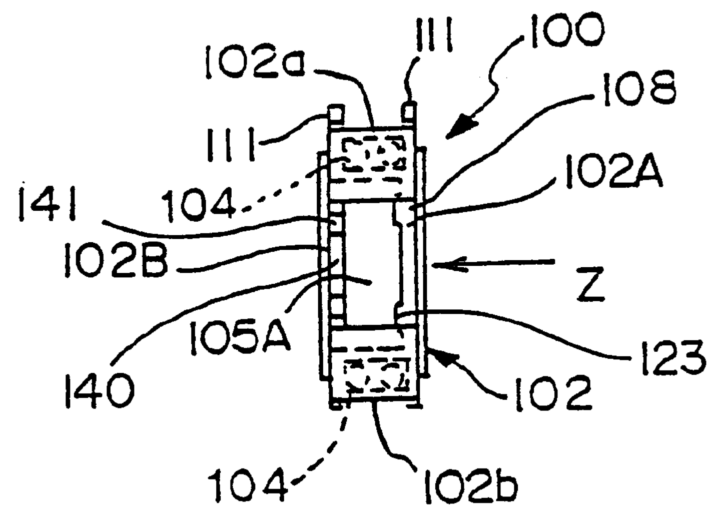
FIG. 13 is a front view of the cartridge.

A cover plate 25 shown in FIG. 1 is attached to the side wall 11B with a screw N1 to cover the opening 11B*k*. As shown in FIG. 11, a pair of holding pieces 26, 26 on which an arm 32 (mentioned later) is held are formed in the back surface of the cover plate 25. Screw holes 27 and boss holes 25*d*, 25*e* with which the cover plate 25 is attached to the side wall 11B are formed in the cover plate 25.

[CARTRIDGE]

As shown in FIGS. 12 to 16, the cartridge 100 comprises a cartridge body 102 including a containing chamber 101, and a pusher 103 disposed moveably in the containing chamber 101. The containing chamber 101 contains a plurality of rectangular and platelike metallic clipping members 105 in piles.

A projection 111 is formed in the upper surface of the cartridge body 102. When the cartridge 100 is inserted into the cartridge chamber 12 of the housing 11, a shaft 112 (see FIG. 1) attached to the housing 11 goes beyond an inclined surface 111*a* of the projection 111 and comes into contact with a rear surface 111*b* of the projection 111. Thereby, the cartridge 100 is fixed to the cartridge chamber 12. Note that the shaft 112 is pressed downward by the force of a spring (not shown).

Figure 17:
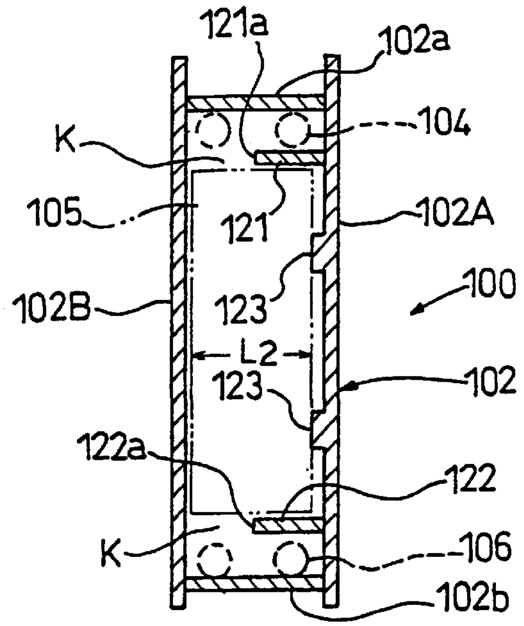
FIG. 17 is a transverse sectional view of the cartridge.

As shown in FIG. 17, the containing chamber 101 is defined by side walls 102A, 102B of the cartridge body 102, and plate portions 121, 122 attached longitudinally to the inner surface of the side wall 102A. Open spaces K having a predetermined width are defined between the end portions 121*a*, 122*a* of the plate portions 121, 122, respectively, and the side wall 102B. Hooking portions 103A, 103B of the pusher 103 project above the plate portion 121 and below the plate portion 122 through the open spaces K, respectively. An end of a spring 104 is hooked by the hooking portion 103A, and the other end of the spring 104 is hooked by a top plate 102*a*. An end of a spring 106 is also hooked by the hooking portion 103B, and the other end of the spring 106 is hooked by a bottom plate 102*b*.

Figure 14:
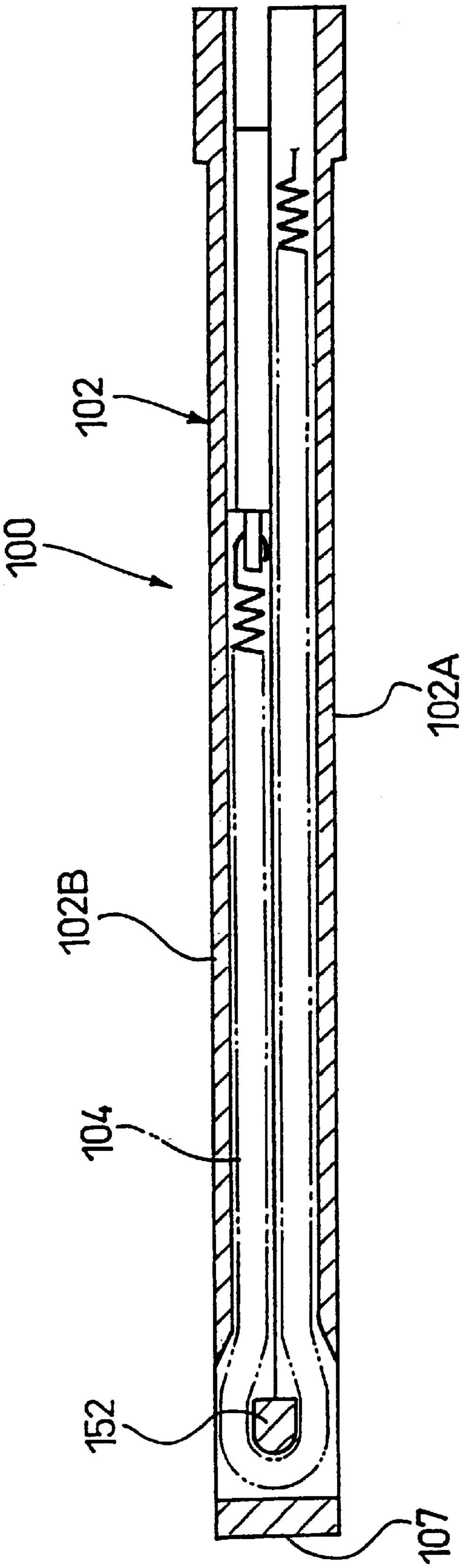
FIG. 14 is a sectional view of the cartridge, showing the disposition of a spring.
Figure 15:
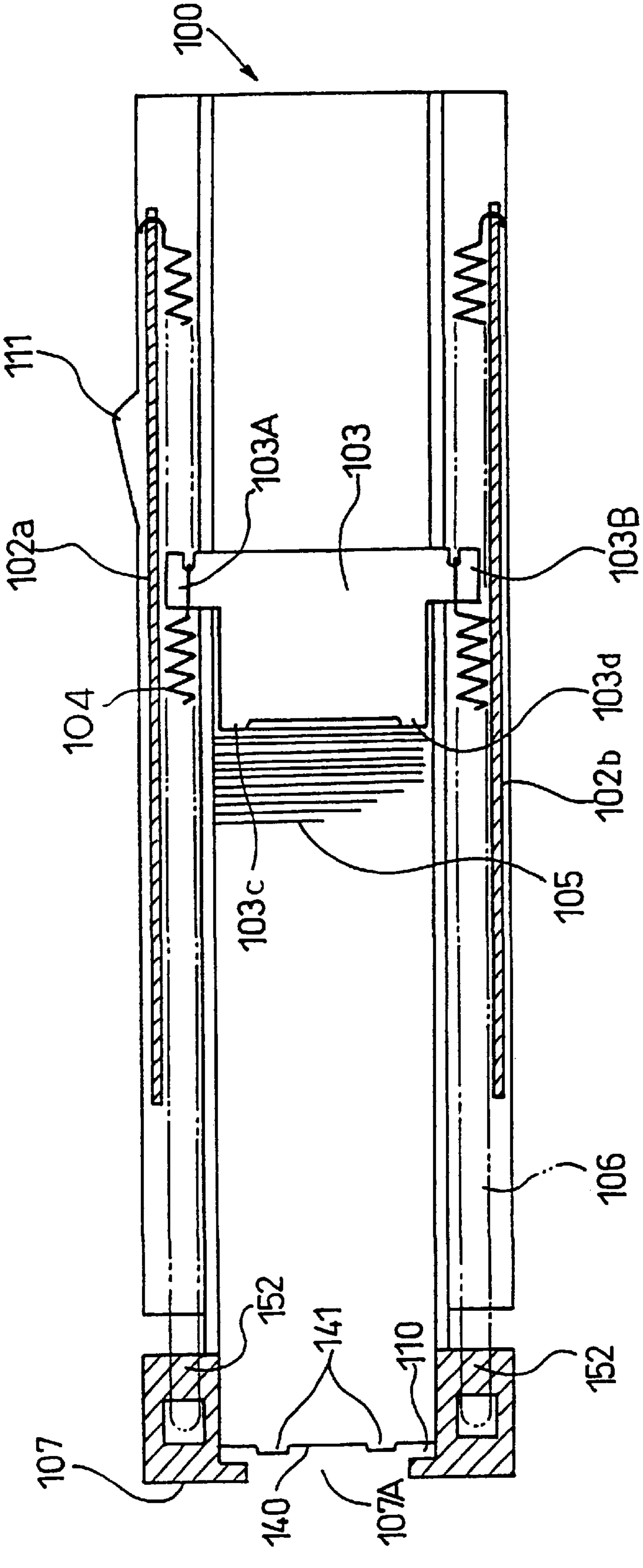
FIG. 15 is a sectional view of the cartridge, showing the positional relationship between the spring and a pusher.
Figure 16:
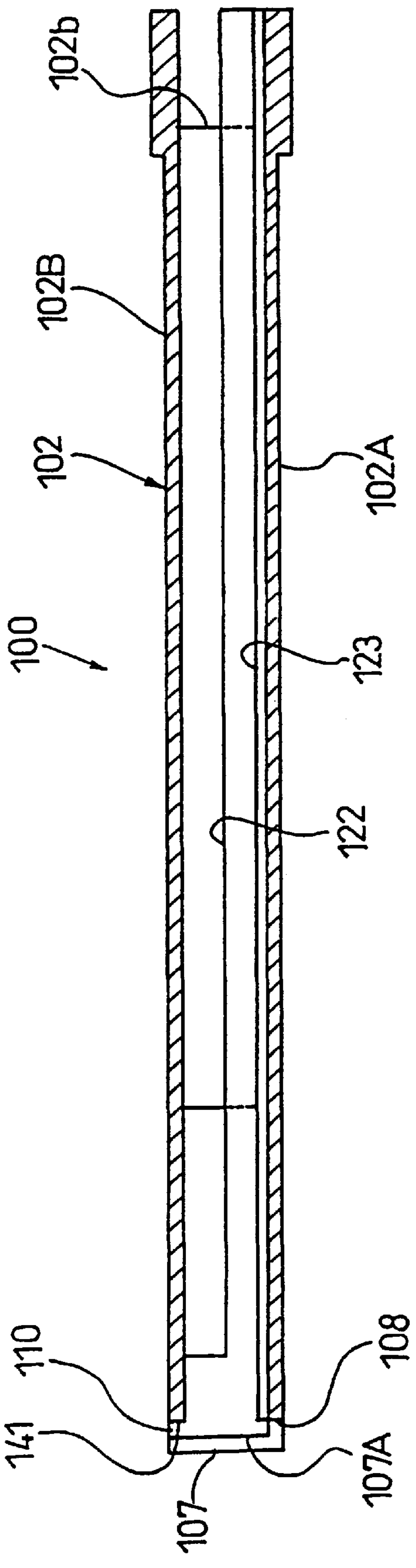
FIG. 16 is a longitudinal sectional view of the cartridge.

The middle part of each of the springs 104, 106 is folded round each shaft portion 152, 152 disposed at the front end of the cartridge body 102, and thus the pusher 103 is pressed forward (leftward in FIGS. 14 and 15). Projections 103*c*, 103*d* coming into contact with the upper and lower parts of the back side of the clipping member 105 are formed in the upper and lower parts of the pusher 103, respectively.

The pusher 103 is pressed on the upper and lower parts thereof by the force of the two springs 104, 106, so that the clipping member 105 can be delivered forward in a stable state without any inclination of the pusher 103.

A pair of convex portions 123, 123 which extend longitudinally and come into contact with the side surface of the clipping member 105 are formed inside the side wall 102A. The convex portions 123, 123 are spaced by a predetermined distance away from each other. When the clipping member 105 is delivered forward by the pusher 103, the pair of convex portions 123, 123 lessen the frictional resistance of the clipping member 105 and also guide the side surfaces of the clipping member 105 in the up and down directions. Therefore, the clipping member 105 can be delivered forward in a stable state.

Figure 19:
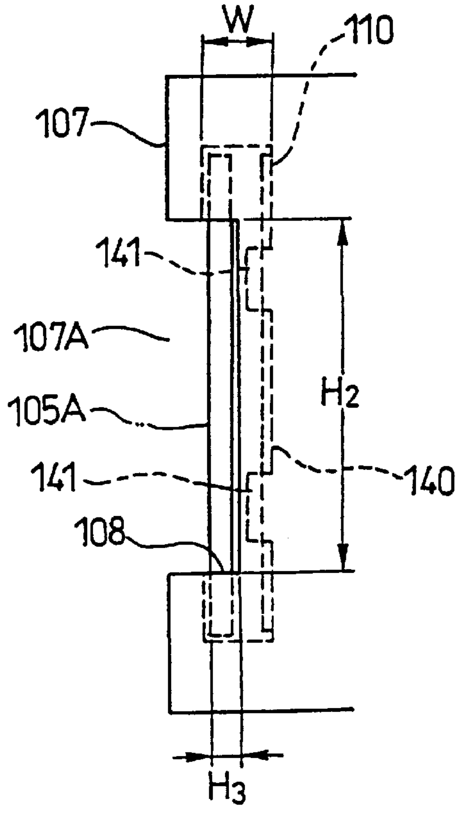
FIG. 19 is an enlarged view of an opening at the end of the cartridge.
Figure 18:
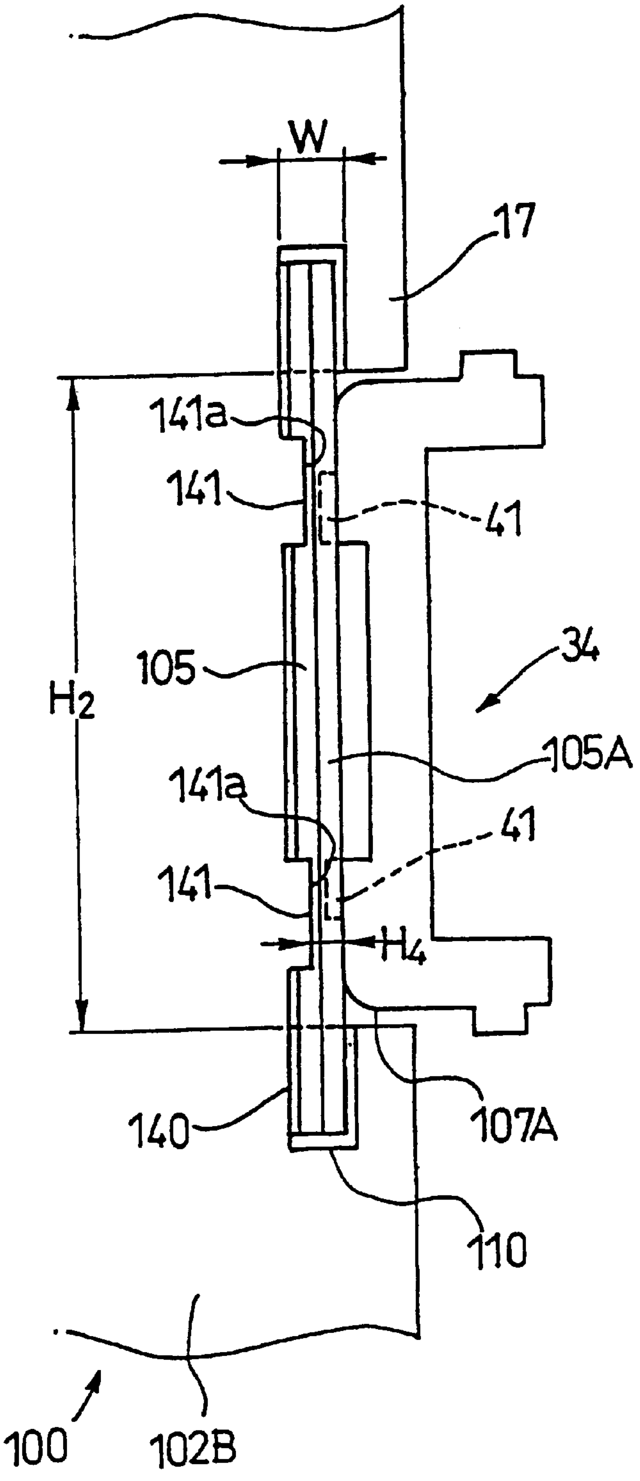
FIG. 18 is an enlarged descriptive drawing showing the positional relationship between an open space of the cartridge and a slider.

An opening 107A connected to the containing chamber 101 is defined in the middle of a front wall 107 formed at the front end of the cartridge body 102. As shown in FIG. 18, the height of the opening 107A is designed to be H2 by which a part of the slider 34 can come thereinto. A concave portion 108 is formed continuously with the opening 107A in the side wall 102A of the cartridge body 102. As shown in FIG. 19, a depth H3 of the concave portion 108 is designed to be greater than the thickness of the clipping member 105. The opening 107A and a concave portion (an insertion opening) 108 bring about a state in which there are exposed parts of the front surface and the side surface of the clipping member 105A positioned in the forefront of the containing chamber 101.

An open space (a picking-out opening) 110 through which the clipping member 105 is picked out is defined between an end surface 140 of the side wall 102B of the cartridge body 102. When the side surface of the clipping member 105A is pushed from a direction of arrow Z (see FIG. 13), the clipping member 105A is picked out of the open space 110. A width W of the open space 110 is designed to be greater than the depth H3 of the concave portion 108.

A pair of projecting portions 141, 141 which are spaced by a predetermined distance in the up and down directions away from each other and face a pair of projecting portions 35A, 35B of the slider 34 are formed in the end surface 140 of the side wall 102B. A distance H4 between projection surfaces 141*a*, 141*a* of projecting portions 141, 141 and a reverse surface 107*b* of the front wall 107 is designed to be greater than the thickness of the clipping member 105.

When the cartridge 100 is attached to the cartridge chamber 12 of the housing 11, the clipping member 105A disposed inside the containing chamber 101 of the cartridge body 102 comes into contact with the reverse surface of the slider 34, so that the cartridge 100 can be positioned, as shown in FIG. 18.

[DRIVING MECHANISM]

Figure 4:
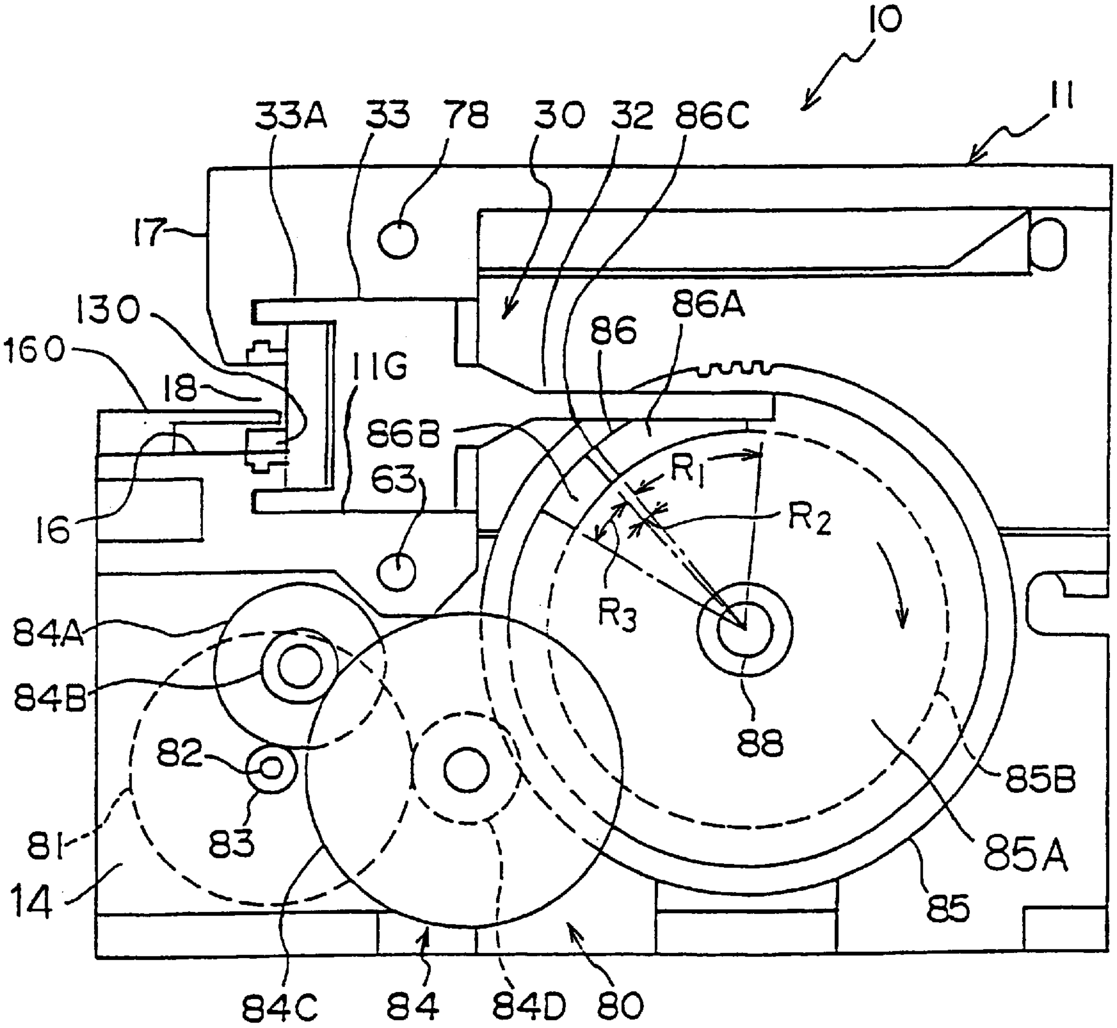
FIG. 4 is a descriptive drawing showing a driving mechanism of the clipping apparatus in FIG. 1.
Figure 5:
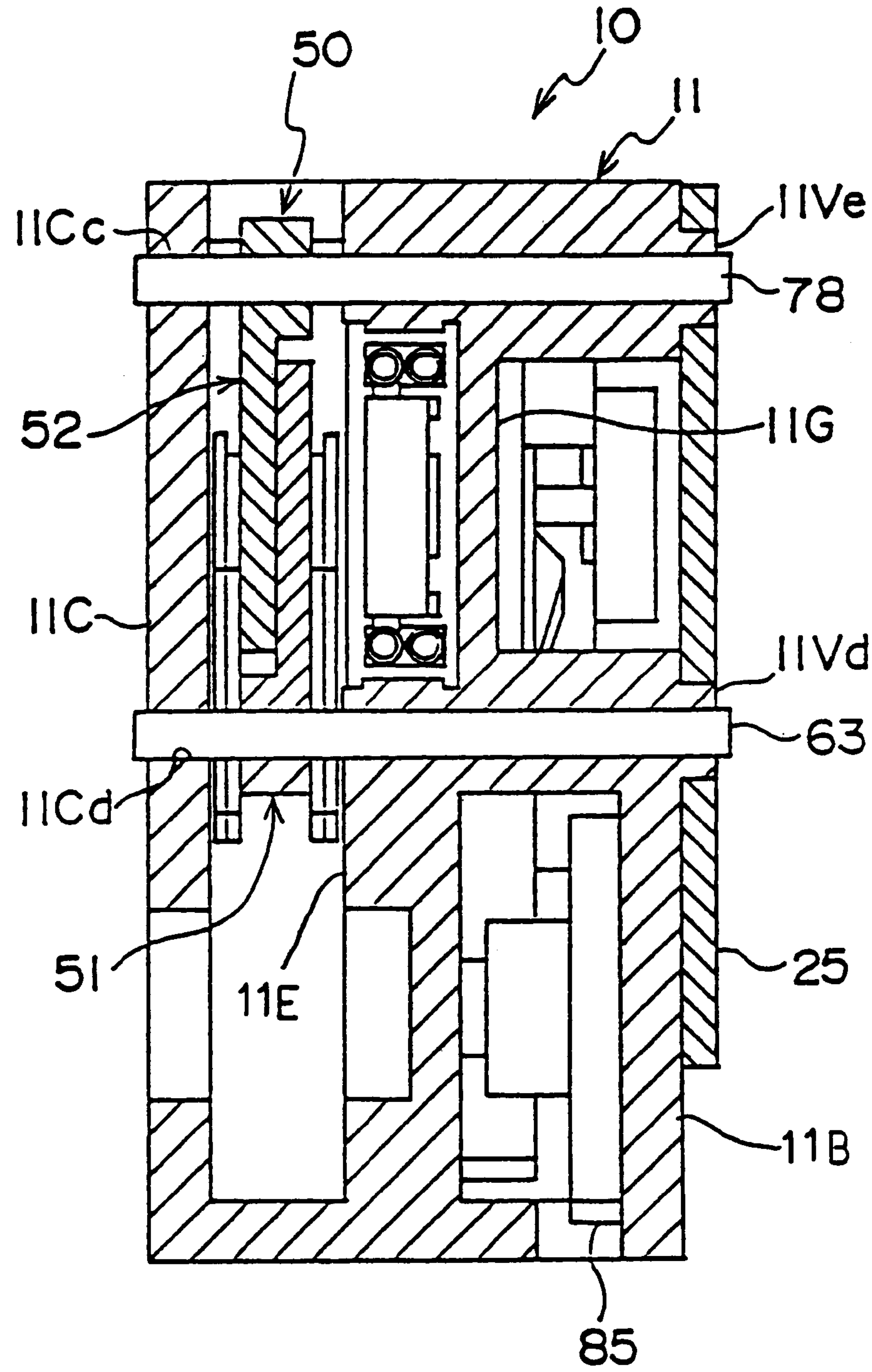
FIG. 5 is a sectional view of the clipping apparatus, taken along line A—A in FIG. 1.
Figure 21:
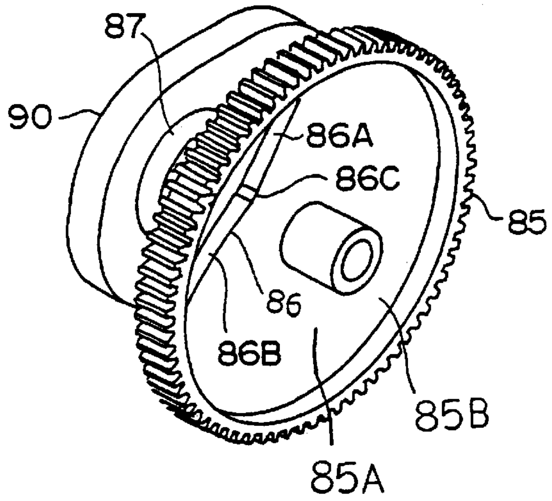
FIG. 21 is a perspective view of a driving gear and a driving cam.

As shown in FIG. 4, a driving mechanism 80 comprises a driving motor 81, a gear 83 attached to the driving motor 81, a reduction gear train 84 including a reduction gear 84A engaged with the gear 83, a driving gear 85 engaged with a reduction gear 84D of the reduction gear train 84, and a driving cam 90 (see FIG. 21). The end part of the driving motor 81 on the side of a drive shaft 82 is attached to the clamp chamber 15 by being inserted into the concave portion 11EU of the partition wall 11E. The drive shaft 82 comes into the drive chamber 14 through the shaft hole 11E*e*, and the gears 83 to 85 are disposed in the drive chamber 14. The driving gear 85 is rotated clockwise (in FIG. 4) via the gear 83 and the gear train 84 by the driving motor 81.

Figure 20:
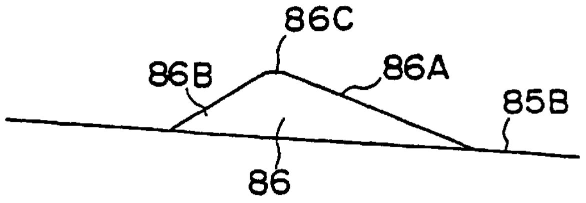
FIG. 20 is a descriptive drawing showing a projected portion.

A ringlike sliding contact surface 85B is disposed on a side 85A of the driving gear 85, and a projecting portion 86 projecting in the axial direction is formed on the sliding contact surface 85B. As shown in FIG. 20, inclined surfaces 86A, 86B and a flat top portion 86C are formed in the projecting portion 86. The top portion 86C functions as a stopping means for allowing the slider 34 to stop temporarily at the clipping position where a clipping operation is performed, and the inclined surface 86B functions as a retreating means for retreating the slider 34 from the clipping position.

Figure 22:
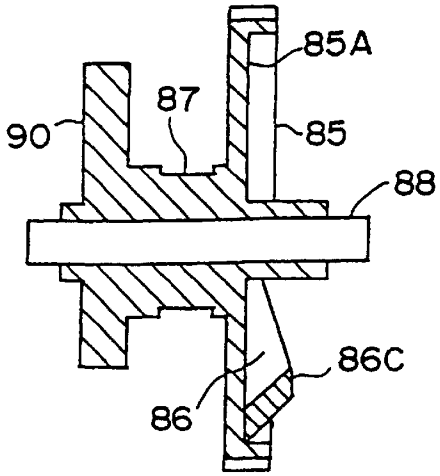
FIG. 22 is a sectional view of the driving gear and the driving cam.

As shown in FIGS. 21 and 22, the driving cam 90 is formed integrally with the other side of the driving gear 85 via a shaft portion 87. A shaft 88 inserted in the shaft holes 11B*a*, 11E*a* of the housing 11 is inserted into the shaft portion 87, and the driving gear 85 can be rotated together with the driving cam 90 round the shaft 88.

Figure 25:
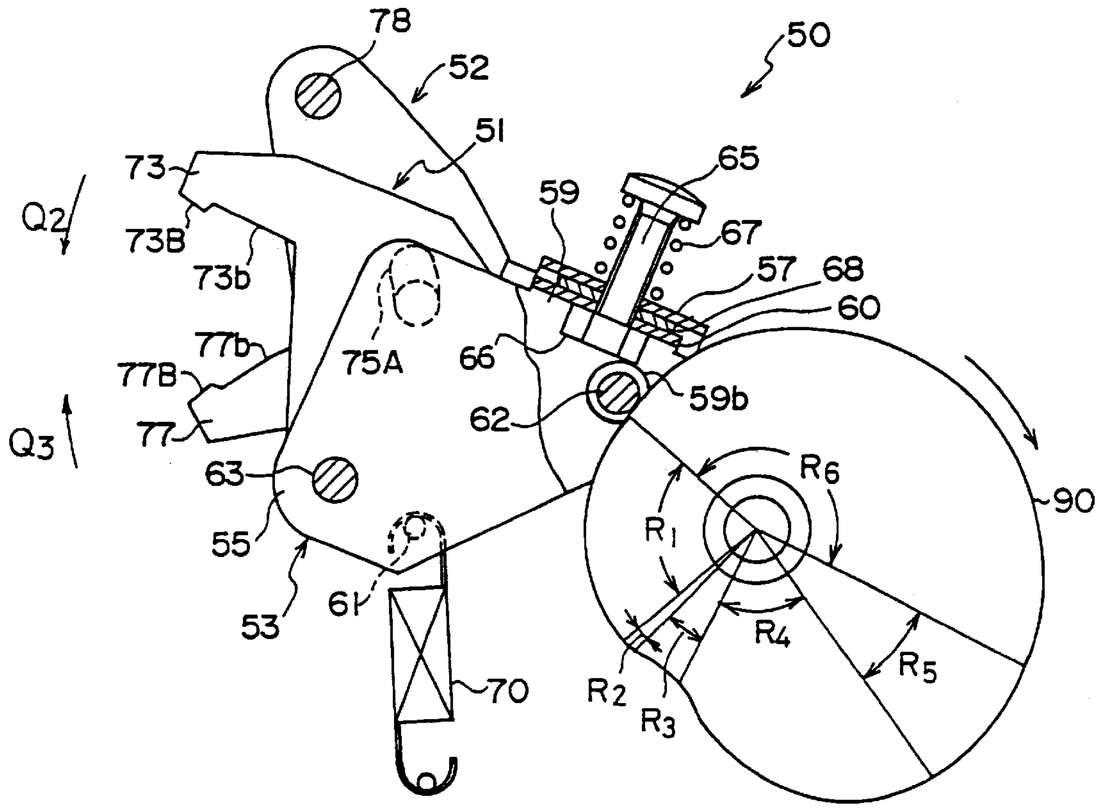
FIG. 25 is a side view showing a clamping mechanism.
Figure 26:
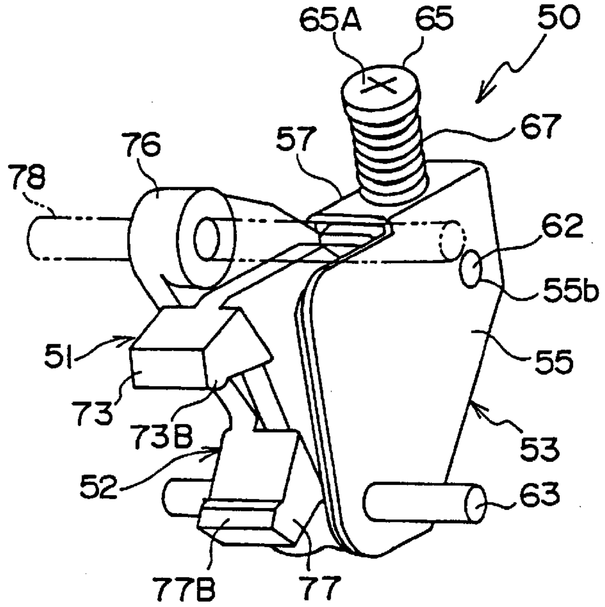
FIG. 26 is a perspective view showing the clamping mechanism.
Figure 27:
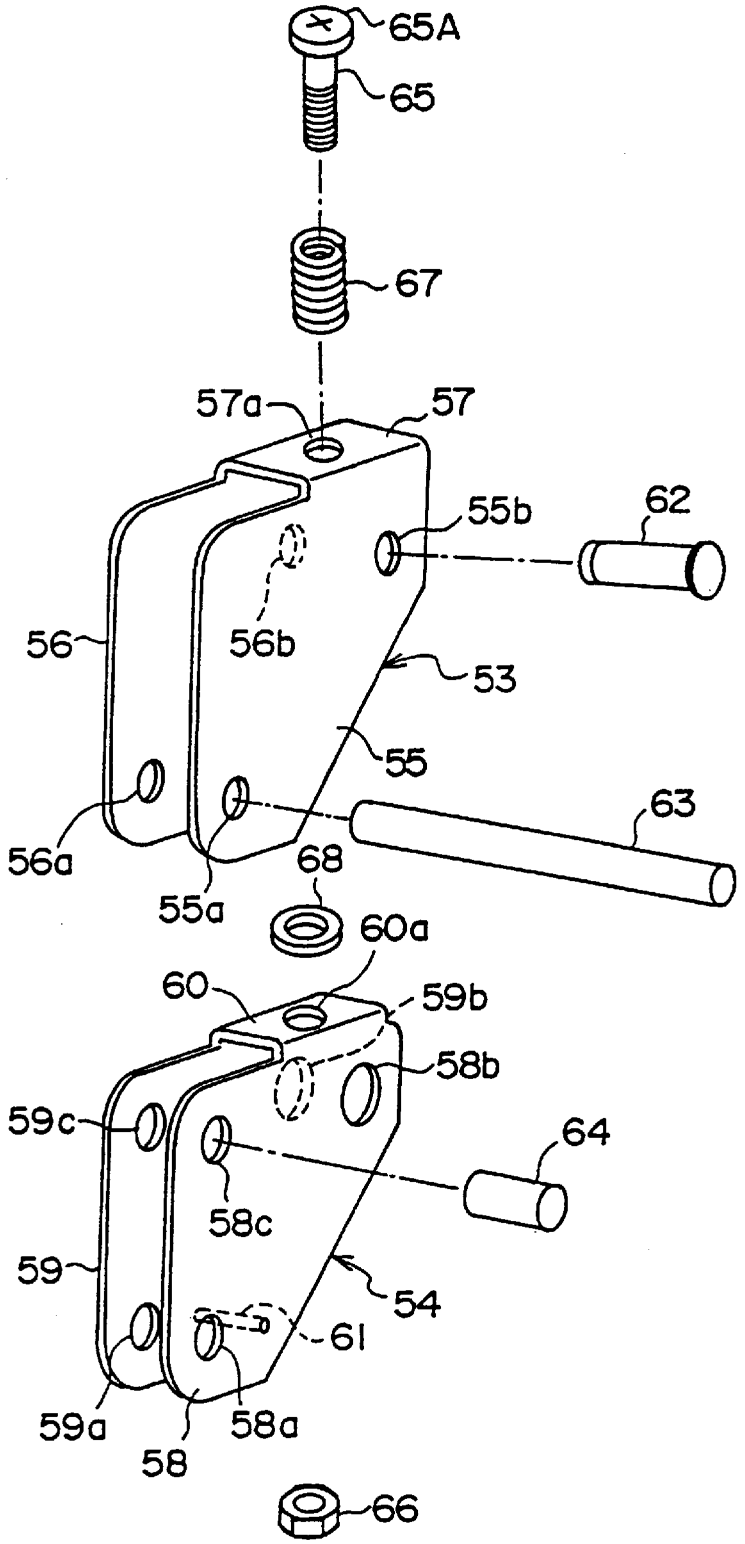
FIG. 27 is an exploded perspective view of a clamp-pivoting member.
Figure 28:
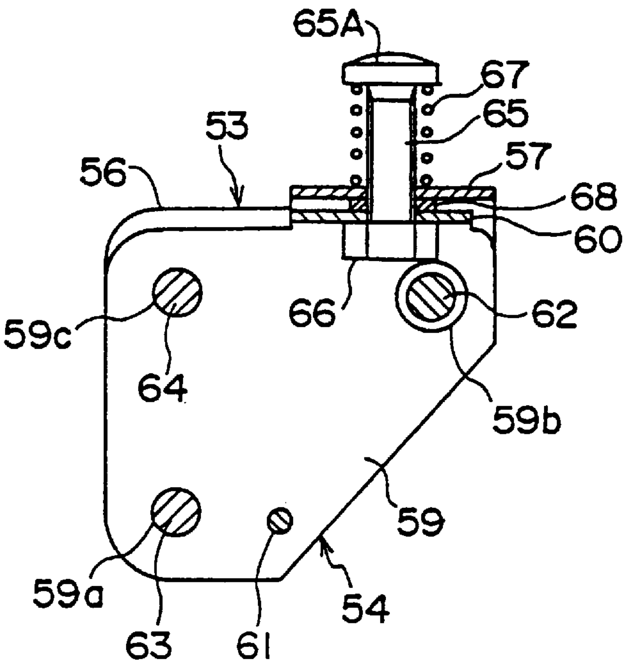
FIG. 28 is a sectional view of the clamp-pivoting member.

As shown in FIG. 25, the driving cam 90 has a small-radius portion R1 whose radius is a minimum, a slightly enlarged portion R2 whose radius becomes slightly larger, a slightly reduced portion R3 whose radius becomes slightly smaller, an enlarging portion R4 whose radius becomes larger, a large-radius portion R5 whose radius is a maximum, and a reducing portion R6 whose radius becomes smaller. As shown in FIG. 4, the small-radius portion R1, the slightly enlarged portion R2, and the slightly reduced portion R3 correspond to the inclined surface 86A of the driving gear 85, the top portion 86C, and the inclined surface 86B, respectively.

[DELIVERING MECHANISM]

Figure 2:
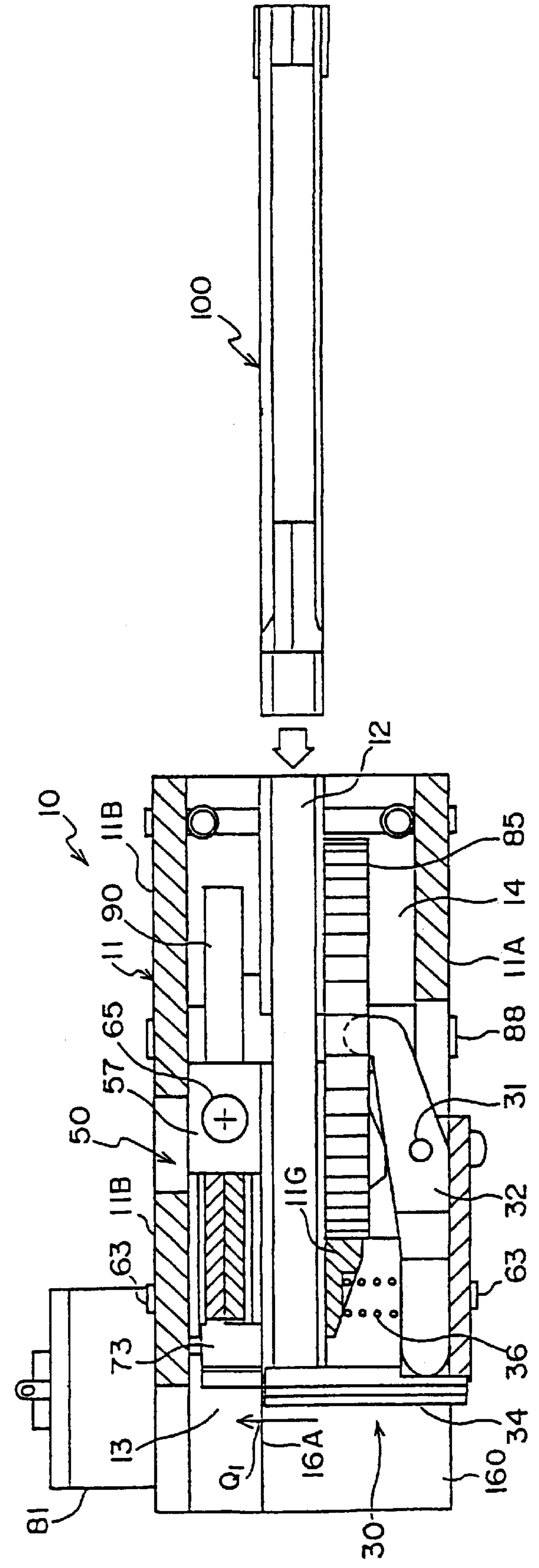
FIG. 2 is a sectional view of the clipping apparatus shown in FIG. 1.
Figure 3:
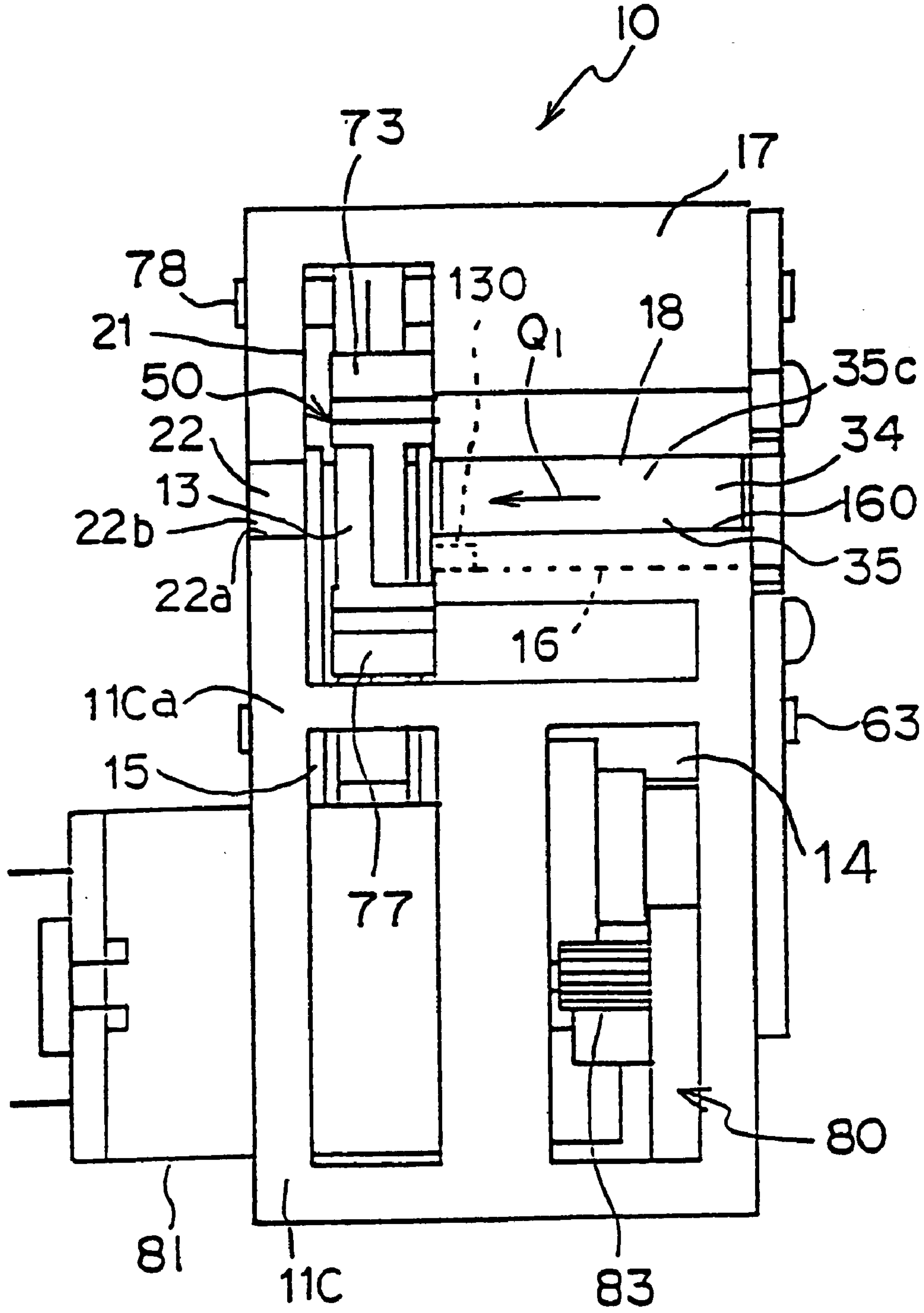
FIG. 3 is a front view of the clipping apparatus shown in FIG. 1.
Figure 6:
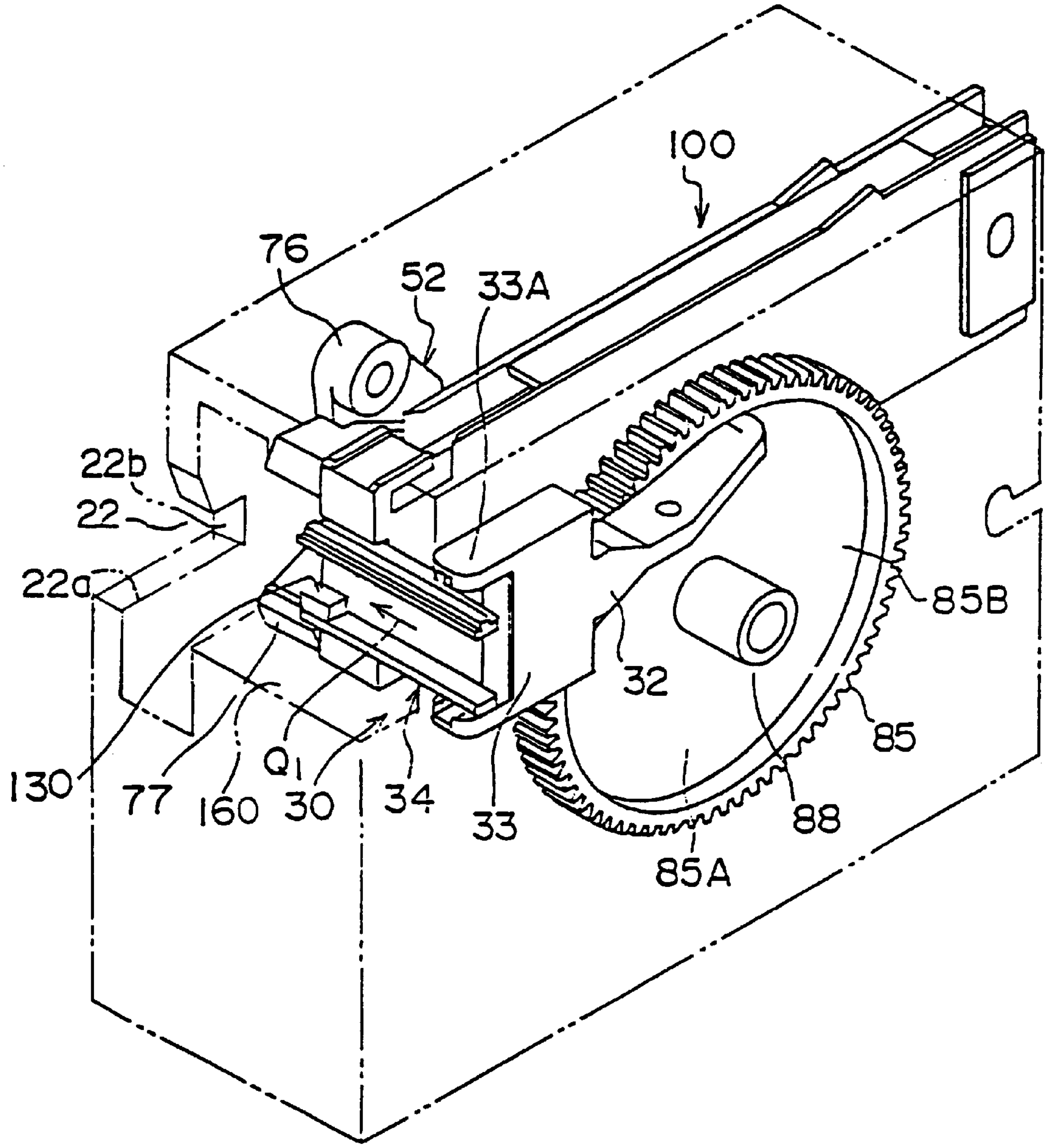
FIG. 6 is a perspective view of a delivering mechanism of the clipping apparatus in FIG. 1.
Figure 7:
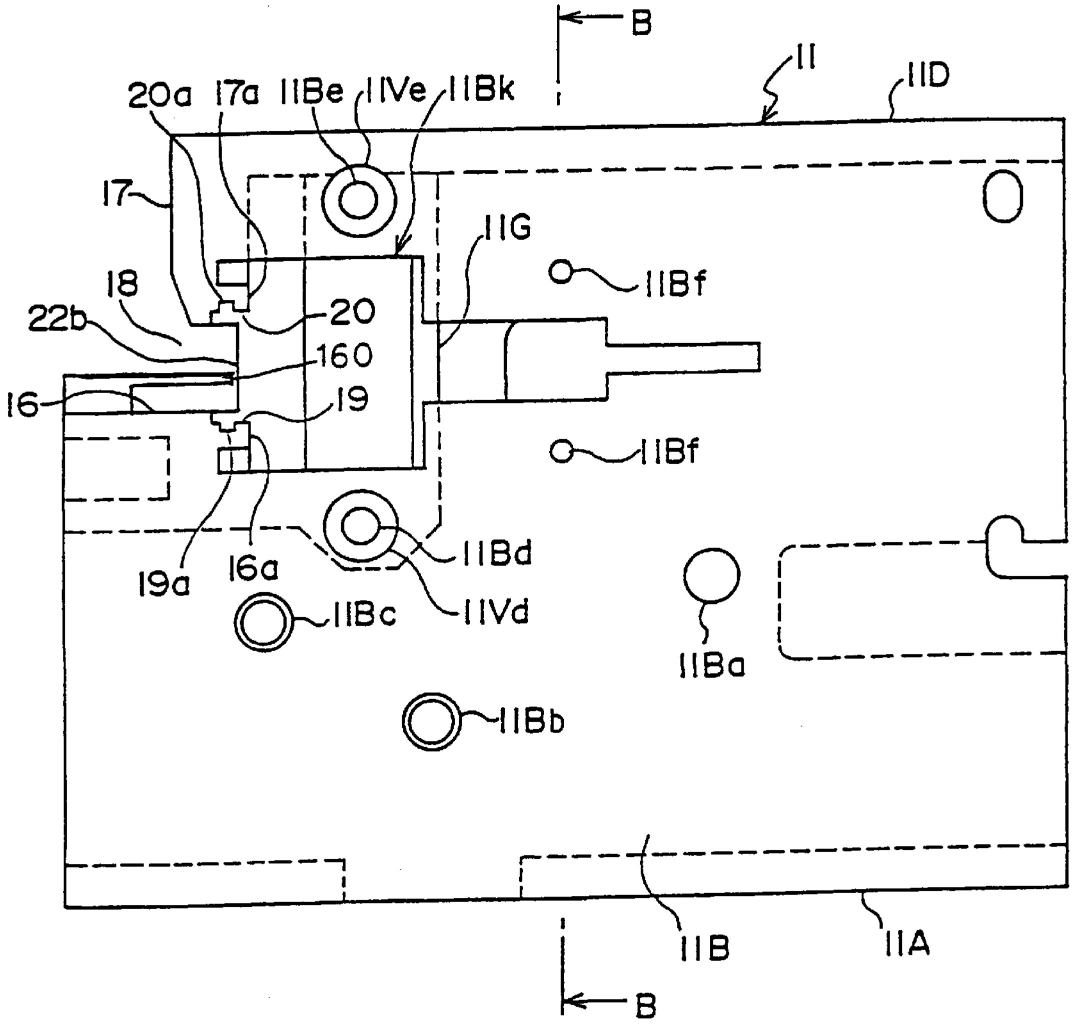
FIG. 7 is a side view of a housing of the clipping apparatus in FIG. 1.
Figure 8:
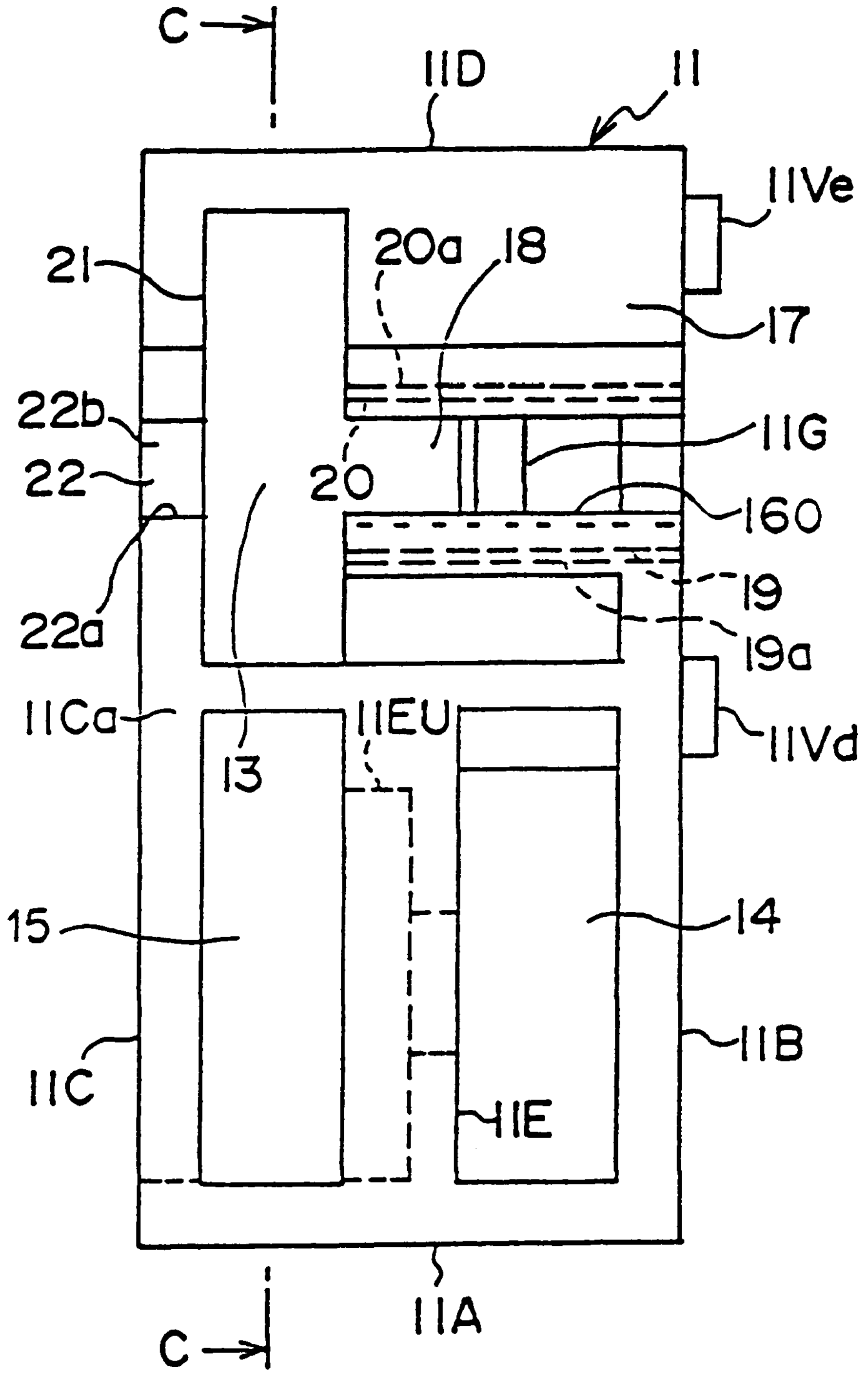
FIG. 8 is a front view of the housing of the clipping apparatus in FIG. 1.
Figure 23:
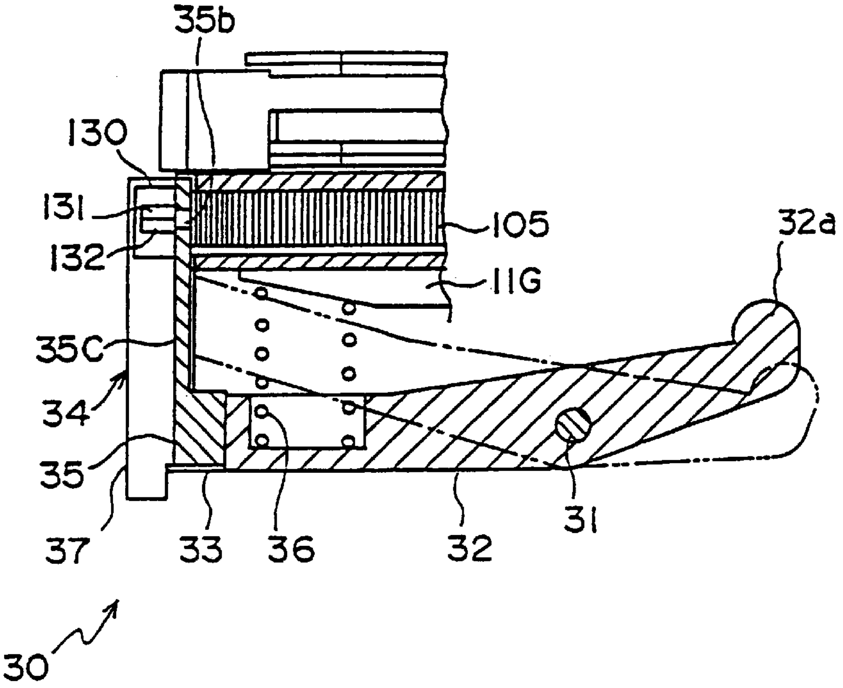
FIG. 23 is a sectional view showing a construction of the delivering mechanism.

As shown in FIGS. 2, 6, and 23, the delivering mechanism 30 comprises the arm 32, and the slider (a regulating member) 34 held on the front end 33 of the arm 32. The arm 32 is pivoted on the holding pieces 26, 26 of the cover plate 25 attached to the side wall 11B of the housing 11. Reference character 31 designates a shaft on which the arm 32 is pivoted, and the shaft 31 is attached to the holding pieces 26, 26.

A projection 32*a* being in contact with the sliding contact surface 85B of the driving gear 85 is formed in the rear part of the arm 32, and a spring 36 is disposed between the arm 32 and the auxiliary wall 11G of the housing 11. The projection 32a of the arm 32 is always in contact with the sliding contact surface 85B by the force of the spring 36. The projection 32*a* of the arm 32 slides on the surface 85B when the driving gear 85 is rotated. Then, the sliding movement causes the movement of the projection 32*a* of the arm 32 on the projecting portion 86 of the sliding contact surface 85B, and thereby the arm 32 is swayed on the shaft 31 to a position shown by a chain line in FIG. 23.

A U-shaped holding portion 33A is formed in the front end 33 of the arm 32, and the holding portion 33A holds the rear end of the slider 34 on a shaft (not shown) from the upper and lower sides so that the slider 34 can be pivoted on the shaft.

Figure 24:
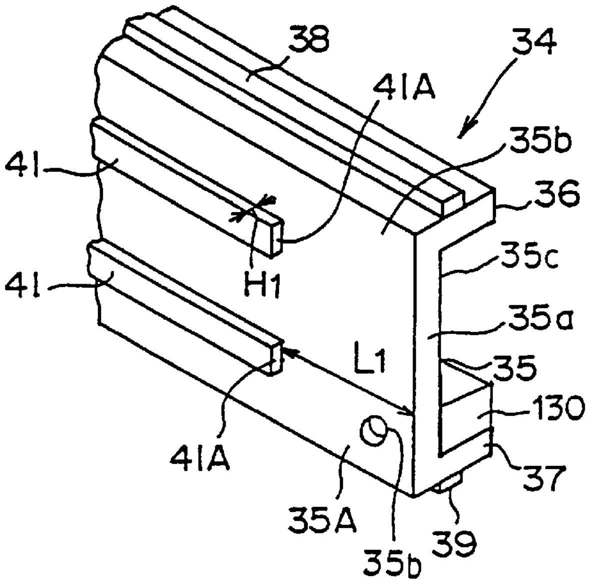
FIG. 24 is a perspective view of a slider of the delivering mechanism.

As shown in FIG. 24, the slider 34 consists of a side plate 35, an upper plate portion 36 formed integrally with the upper part of the side plate 35, and a lower plate portion 37 formed integrally with the lower part of the side plate 35, and is constructed such that the side plate 35 and the upper and lower plate portions 36, 37 make the section thereof in a U-shape. Guide convex portions 38, 39 extending longitudinally are attached to the upper surface of the upper plate portion 36 and the under surface of the lower plate portion 37, respectively, and two convex portions 41, 41 extending longitudinally are attached to the back surface of the side plate 35.

A thickness H1 of the convex portions 41, 41 is designed to be equal to or shorter than the thickness of the clipping member 105, and ends of the convex portions 41, 41 are contact surfaces 41A, 41A coming into contact with the side of the clipping member 105, respectively. A distance L1 of a front end portion 35A from the contact surfaces 41A, 41A to a front surface 35*a* of the side plate 35 is designed to be longer than a width L2 (see FIG. 17) of the clipping member 105 such that the rear part of the front end portion 35A is inside the opening 107A of the front wall 107 of the cartridge 100 and, in addition, the back surface thereof is in contact with the front surface of the clipping member 105A.

As shown in FIG. 24, a hole 35*b* is formed in the lower part of the front end portion 35A of the side plate 35, and a sensor 130 for detecting that there is the clipping member 105 is attached to the front surface of the side plate 35. The sensor 130 comprises a light emitting diode for emitting a beam of light toward the clipping member 105 through the hole 35*b*, a photodiode for receiving the beam of light reflected by the clipping member 105 through the hole 35*b*, and the like. The sensor 130 is positioned between the table-receiving portion 16 of the housing 11 and the table 160 so that the slider 34 can be moved without hindrance.

The upper and lower plate portions 36, 37 of the slider 34 are inserted in the concave portions 20, 19 of the table-receiving portion 16 and the upper-front wall portion 17 of the housing 11, respectively, and the guide convex portions 38, 39 of the upper and lower plate portions 36, 37 are engaged with the engagement grooves 20*a*, 19*a* of the concave portions 20, 19, respectively. The guide convex portions 38, 39 are guided to the engagement grooves 20*a*, 19*a*, respectively, and thereby the slider 34 is moved in the right and left directions along with the sway of the arm 32.

The front surface 35*c* of the side plate 35 of the slider 34 is flush with the side surface 22*b* of the concave portion 22 formed in the side wall 11C of the housing 11, and functions as a contact surface which comes into contact with an end of the sheets S so as to position the sheets S.

[CLAMPING MECHANISM]

As shown in FIGS. 25 to 28, the clamping mechanism 50 is made up of a pair of clamp members 51, 52, two clamp pivotal members 53, 54 between which the clamp members 51, 52 are disposed, and a shaft 62 which is attached to the clamp pivotal member 53 and is in contact with the circumferential surface of the driving cam 90.

[CLAMP PIVOTAL MEMBER]

The clamp pivotal member 53 consists of a pair of side plate portions 55, 56 which face each other, a connecting plate portion 57 which connects the upper ends (in FIGS. 25 to 28) of the side plate portions 55, 56. Holes 55*a*, 56*a* which are opposite to each other and holes 55*b*, 56*b* which are opposite to each other are formed in the lower parts and the upperback parts of the side plate portions 55, 56, respectively. A hole 57*a* for a screw is formed in the connecting plate portion 57.

A shaft 63 passes through the holes 55*a*, 56*a* of the side plate portions 55, 56, and is inserted into the side wall 11B of the housing 11 and the shaft hole 11B*d*, 11E*d* of the partition wall 11E, and also into a shaft hole 11C*d* (see FIG. 5) of the side wall 11C of the housing 11. The clamp pivotal member 53 can pivot on the shaft 63. A shaft 62 used as a cam floor is attached rotatably to the holes 55*b*, 56*b* of the side plate portions 55, 56.

The clamp pivotal member 54 consists of a pair of side plate portions 58, 59 which are placed inside of the side plate portions 55, 56 of the clamp pivotal member 53 and also are opposite to each other, and a connecting plate portion 60 which connects the upper ends of the side plate portions 58, 59.

Holes 58*a*, 59*a* which are opposite to each other, holes 58*b*, 59*b* which are opposite to each other, and holes 58*c*, 59*c* which are opposite to each other are formed in the lower parts, the upper-back parts, and the upper-front parts, of the side plate portions 58, 59, respectively. A shaft 64 is inserted in the holes 58*c*, 59*c*, and a connection shaft 61 is formed between the lower parts of the side plate portions 58, 59. A hole 60*a* for a screw is formed in the connecting plate portion 60. The diameter of the holes 58*b*, 59*b* of the side plate portions 58, 59 is designed to be larger than that of the holes 55*b*, 56*b* of the side plate portions 55, 56. The holes 55*a*, 56*a* of the side plate portions 55, 56 are opposite to the holes 58*a*, 59*a* of the side plate portions 58, 59, and the holes 55*b*, 56*b* of the side plate portions 55, 56 are opposite to the holes 58*b*, 59*b* of the side plate portions 58, 59.

The shaft 62 attached to the holes 55*b*, 56*b* of the side plate portions 55, 56 of the clamp pivotal member 53 is slidably inserted in the holes 58*b*, 59*b* of the side plate portions 58, 59 of the clamp pivotal member 54. The shaft 63 inserted in the holes 55*a*, 56*a* of the side plate portions 55, 56 of the clamp pivotal member 53 penetrates the holes 58*a*, 59*a* of the side plate portions 58, 59 of the clamp pivotal member 54.

A screw 65 is inserted in the hole 57*a* of the connecting plate portion 57 of the clamp pivotal member 53 and the hole 60a of the connecting plate portion 60 of the clamp pivotal member 54, and a nut 66 is engaged with the screw 65 to be in contact with the under surface of the connecting plate portion 60. A spring 67 is disposed between a head 65A of the screw 65 and the connecting plate portion 57, and the connecting plate portions 57, 60 of the clamp pivotal members 53, 54 are pressed in the directions in which the connecting plate portions 57, 60 approach each other by the force of the spring 67, so that the clamp pivotal member 54 can be pivoted together with the clamp pivotal member 53 on the shaft 63. Reference character 68 denotes a washer disposed between the connecting plate portions 57, 60.

The clamp pivotal member 54 is designed to be pivoted simultaneously together with the clamp pivotal member 53 on the shaft 63. Further, since the shaft 62 is slidably inserted in the holes 58*b*, 59*b* of the side plate portions 58, 59, the clamp pivotal member 53 can be pivoted on the shaft 63 only by a predetermined angle against the force of the spring 67 relative to the clamp pivotal member 54.

An end of a spring 70 is hooked up to the shaft 61 of the clamp pivotal member 54, and the other end of the spring 70 is hooked up to a hooking portion (not shown) of the housing 11. The clamp pivotal members 53, 54 are pressed clockwise (in FIG. 25) on the shaft 63, and thereby, the shaft 62 attached to the clamp pivotal member 53 is always in contact with the circumferential surface of the driving cam 90.

The clamp members 51, 52 are disposed between the side plate portions 58, 59 of the clamp pivotal member 54.

[CLAMP MEMBER]

Figure 29:
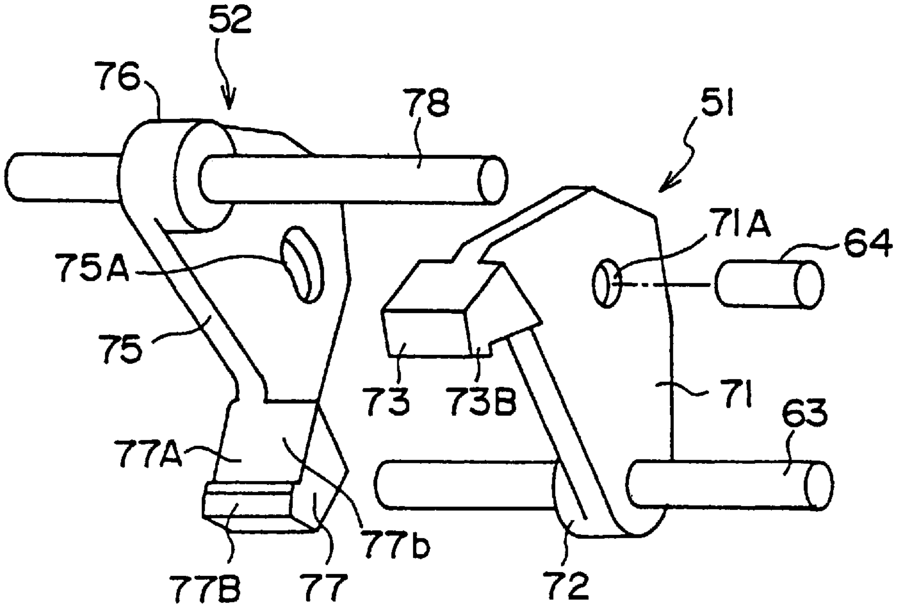
FIG. 29 is a perspective view of a clamping member.

As shown in FIG. 29, the clamp member 51 consists of a platelike arm portion 71, a bearing portion 72 formed in the lower part of the arm portion 71, and a substantially square-shaped clamp portion 73 which has a thickness larger than that of the arm portion 71 and projects frontward in the upper part of the arm portion 71. A hole 71A is formed in the middle part of the arm portion 71. The shaft 63 penetrating the holes 55*a*, 56*a*, 58*a*, 59*a* of the side plate portions 55, 56, 58, 59 of the clamp pivotal members 53, 54 penetrates the bearing portion 72, and the shaft 64 inserted in the holes 58*c*, 59*c* of the side plate portions 58, 59 of the clamp pivotal member 54 is inserted in the hole 71A. The clamp member 51 is pivoted together with the clamp pivotal members 53, 54 on the shaft 63.

Figure 30A:
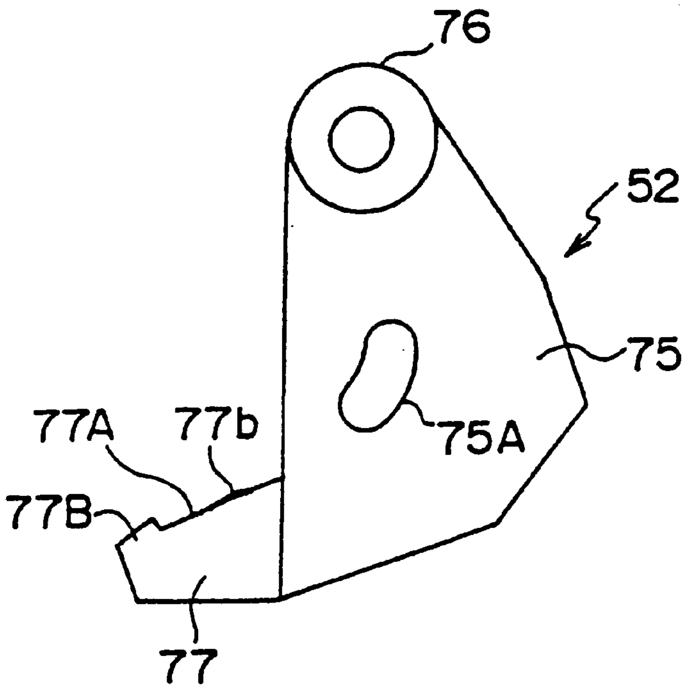
FIG. 30(A) is a side view of the clamping member.
Figure 30B:
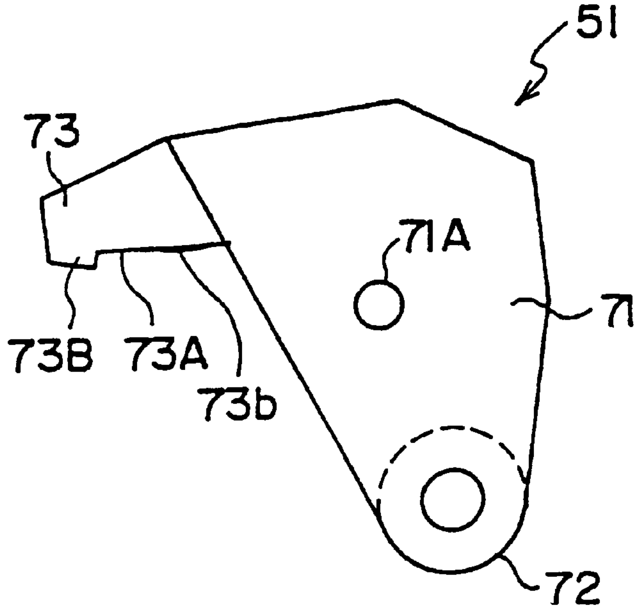
FIG. 30(B) is a side view of the clamping member.

The clamp portion 73, as shown in FIG. 30(B), is provided with a projection 73B which is formed in front of an under surface (a clamp surface) 73A thereof and which projects downward and extends in the right and left directions (in the directions parallel to the shaft 63). The under surface of the projection 73B is made flat. A swelled portion 73*b* which is slightly swelled downward is formed at the rear of the under surface 73A.

The clamp member 52 consists of a platelike arm portion 75 in contact with the arm portion 71 of the clamp member 51, a bearing portion 76 formed in the upper part of the arm portion 75, and a substantially square-shaped clamp portion 77 which has a thickness larger than that of the arm portion 75 and projects frontward in the lower part of the arm portion 75. A circular-arc-shaped long hole 75A is formed in the middle part of the arm portion 75.

A shaft 78 inserted in the shaft hole 11B*e* of the side wall 11B of the housing 11 and a shaft hole 11C*c* (see FIG. 5) of the side wall 11C thereof penetrates the bearing portion 76, so that the clamp member 52 can be pivoted on the shaft 78. The shaft 64 inserted in the holes 58*c*, 59*c* of the side plate portions 58, 59 of the clamp pivotal member 54 penetrates the long hole 75A of the arm portion 75. The shaft 64 can make a relative motion along the long hole 75A, and the long hole 75A has a configuration in which the clamp members 51, 52 move symmetrically.

Therefore, when the clamp member 51 is pivoted counterclockwise (in FIG. 25) on the shaft 63 with the clamp pivotal members 53, 54, the clamp member 52 is pivoted clockwise (in FIG. 25) on the shaft 78.

The clamp portion 77 faces the clamp portion 73 of the clamp member 51, and is provided with a projection 77B which is formed in front of an upper surface (a clamp surface) 77A thereof and which projects upward and extends in the right and left directions (in the directions parallel to the shaft 78). The clipping member 105 taken out from the cartridge 100 by the slider 34 is held between the projection 77B of the clamp member 52 and the projection 73B of the clamp member 51.

The upper surface of the projection 77B is made flat, and a swelled portion 77*b* which is slightly swelled upward is formed at the rear of the upper surface 77A. When the clamp members 51, 52 are pivoted on the shafts 63, 78, respectively, the clamp portions 73, 77 perform a closing motion so as to bend the clipping member 105. Then, the bent portion of the clipping member 105 is tightly pressed by swelled portions 73*b*, 77*b*.

The driving motor 81 is controlled by a control circuit (not shown). The control circuit controls the driving motor 81, for example, according to a clipping signal output by a copying machine body and a detection signal output by the sensor 130.

[OPERATION]

There will be now described the operation of the clipping apparatus having the aforementioned construction.

Figure 31:
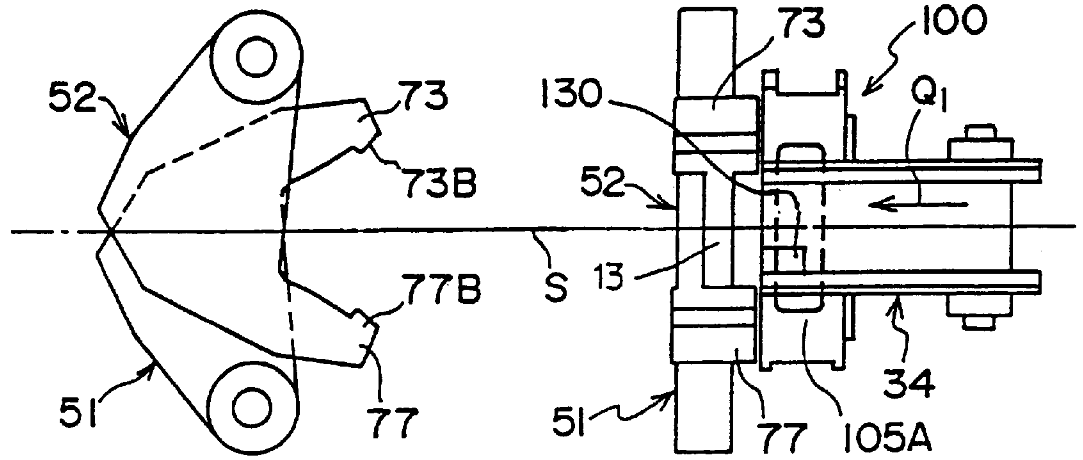
FIG. 31 is a descriptive drawing showing the relationship between the clamping member and a slider.

First, the cartridge 100 is attached to the cartridge chamber 12 of the housing 11. Before the driving motor 81 is driven, the driving gear 85 and the driving cam 90 are in an initial position shown in FIGS. 4 and 25. The slider 34 is in a home position shown in FIGS. 2 and 31. The back surface of the front end portion 35A of the slider 34 is inside the opening 107A of the front wall 107 of the cartridge 100 and the back surface thereof is in contact with the front surface of the clipping member 105A. The sensor 130 detects the clipping member 105 disposed inside the cartridge 100. The clamp members 51, 52 are in a home position shown in FIGS. 25 and 31.

As shown in FIGS. 1 and 4, the end of several sheets S (whose thickness is relatively small) is positioned by coming into contact with the front surface 35*c* of the side plate 35 of the slider 34 and the side surface 22*b* of the concave portion 22 formed in the side wall 11C of the housing 11.

When a clipping signal is output by the copying machine body, the sensor 130 detects the clipping member 105 disposed inside the cartridge 100, and thereby the control circuit controls the driving motor 81 according to the clipping signal. The driving gear 85 is rotated clockwise (in FIG. 4) via the gear 83 and the gear train 84 by the driving motor 81. The projection 32*a* of the arm 32 slides on the sliding contact surface 85B of the driving gear 85 while the driving gear 85 is being rotated.

When the projection 32*a* of the arm 32 moves on the inclined surface 86A of the projecting portion 86, the arm 32 is pivoted clockwise (in FIG. 23) on the shaft 31, so that the slider 34 can move in the direction of arrow Q1 (see FIGS. 2, 3, 6, and 31). Then, by the movement of the slider 34, the contact surfaces 41A, 41A of the convex portions 41, 41 of the slider 34 come into contact with the side surface of the clipping member 105A in the cartridge 100, and then the clipping member 105A is picked out of the open space 110 of the cartridge body 102.

Figure 32:
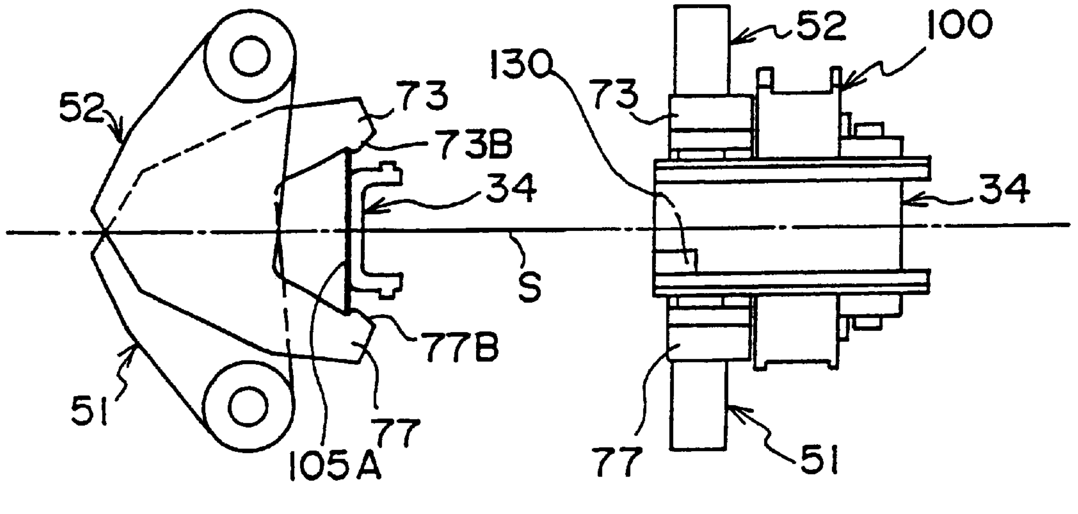
FIG. 32 is a descriptive drawing showing the relationship between the clamping member and the slider.

Next, when the projection 32*a* of the arm 32 reaches the top portion 86C of the projecting portion 86 by the rotation of the driving gear 85, the arm 32 is pivoted up to a position shown by a chain line in FIG. 23, and the slider 34 is moved to a position shown in FIG. 32. Thereby, the clipping member 105A is delivered to the clipping position 13. The clipping member 105A delivered to the clipping position 13 is held on the projections 73B, 77B of the clamp members 51, 52.

Figure 33:
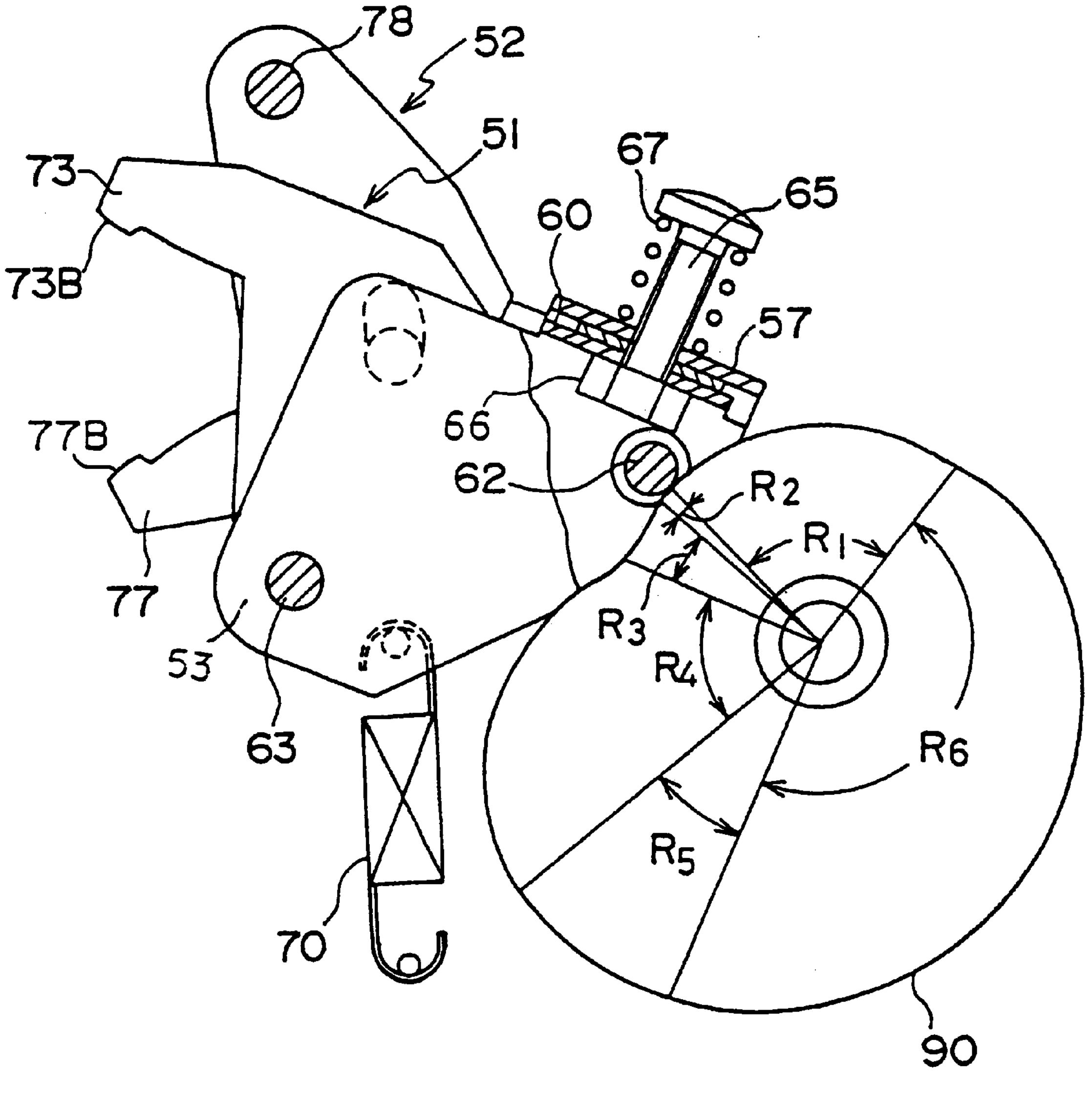
FIG. 33 is a descriptive drawing showing the relationship between the driving cam and the clamping member.

When the clipping member 105A is delivered to the clipping position 13, the driving cam 90 is in a position shown in FIG. 33 after rotating. Since the shaft 62 attached to the clamp pivotal member 53 is in contact with the circumferential surface of the small-radius portion R1 of the driving cam 90 until this point of time, the clamp members 51, 52 are stopped from being pivoted.

When the driving cam 90 rotates together with the driving gear 85, and, as shown in FIG. 33, the shaft 62 comes into contact with the circumferential surface of the slightly enlarged portion R2 of the driving cam 90, the clamp pivotal members 53, 54 are slightly pivoted counterclockwise (in FIG. 33) on the shaft 63. The clamp members 51, 52 are slightly pivoted in a closing direction correspondingly to the pivotal motion of the clamp pivotal members 53, 54. At this time, the projection 32*a* of the arm 32 moves on the top portion 86C of the projecting portion 86 of the driving gear 85, so that the slider 34 stops temporarily at a position shown in FIGS. 32 and 34.

On the other hand, the pivotal motion of the clamp members 51, 52 makes the space defined between the clamp portions 73, 77 slightly narrower, so that the clipping member 105A can be bent. At this time, the slider 34 is kept making a temporary stop in front of the clipping member 105A, and thus the clipping member 105A is bent into a bell-crank shape while being pressed against the slider 34. In this way, the clipping member 105A is bent while being pressed against the slider 34, so that it can be bent more precisely in the right direction in FIG. 34 and more easily.

Figure 34:
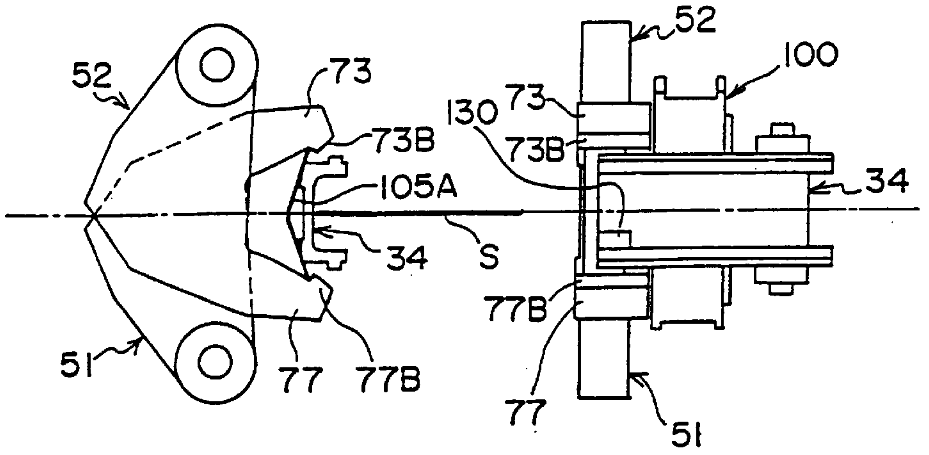
FIG. 34 is a descriptive drawing showing the relationship between the clamping member and the slider.

As shown in FIG. 34, when the clipping member 105A is bent into the bell-crank shape, the shaft 62 inserted in the clamp pivotal member 53 comes into contact with the circumferential surface of the slightly-reduced portion R3 of the driving cam 90. On account of this contact, the clamp pivotal members 53, 54 are slightly pivoted clockwise (in FIG. 33) on the shaft 63, and the clamp members 51, 52 are slightly pivoted in an opening direction. Thereby, the space defined between the clamp portions 73, 77 is slightly opened.

Figure 35:
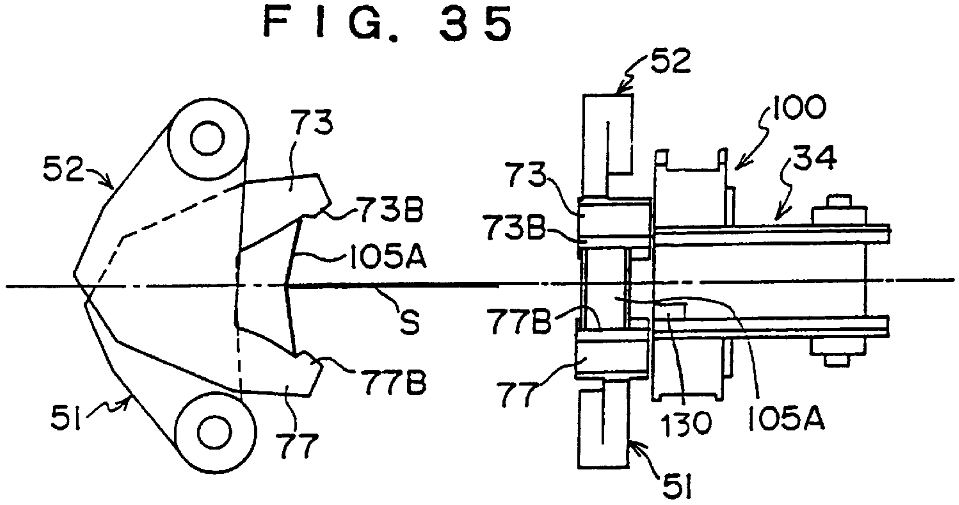
FIG. 35 is a descriptive drawing showing the relationship between the clamping member and the slider.

On the other hand, while the shaft 62 inserted in the clamp pivotal member 53 is in contact with the circumferential surface of the slightly reduced portion R3 of the driving cam 90, the projection 32*a* of the arm 32 comes into contact with the inclined surface 86B of the projecting portion 86 of the driving gear 85 correspondingly to the rotation of the driving gear 85. Thereby, the arm 32 is pivoted from the position shown by the chain line in FIG. 23 and then returned to the position shown by the solid line, and the slider 34 is returned to the home position. When the slider 34 is returned to the home position, as shown in FIG. 35, the clamp members 51, 52 are slightly pivoted in the opening direction, and thereby the pressure of the clipping member 105A against the slider 34 is released. Therefore, the slider 34 is returned smoothly to the home position.

Figure 36:
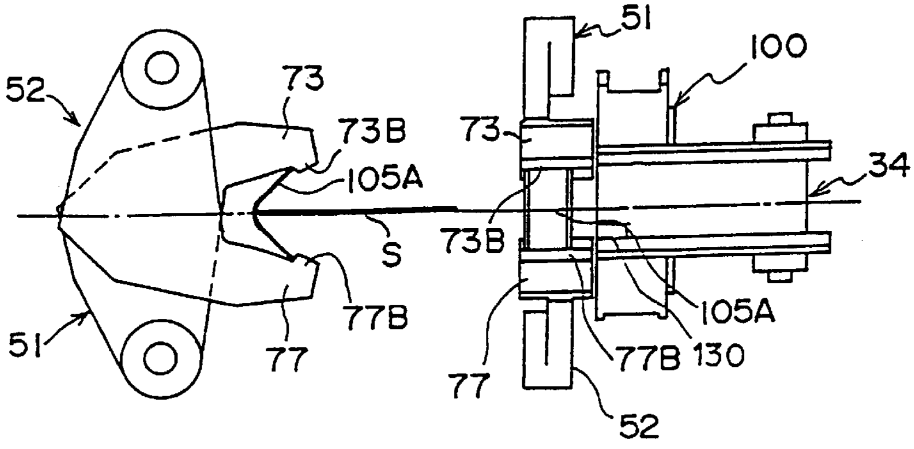
FIG. 36 is a descriptive drawing showing the relationship between the clamping member and the slider.
Figure 37:
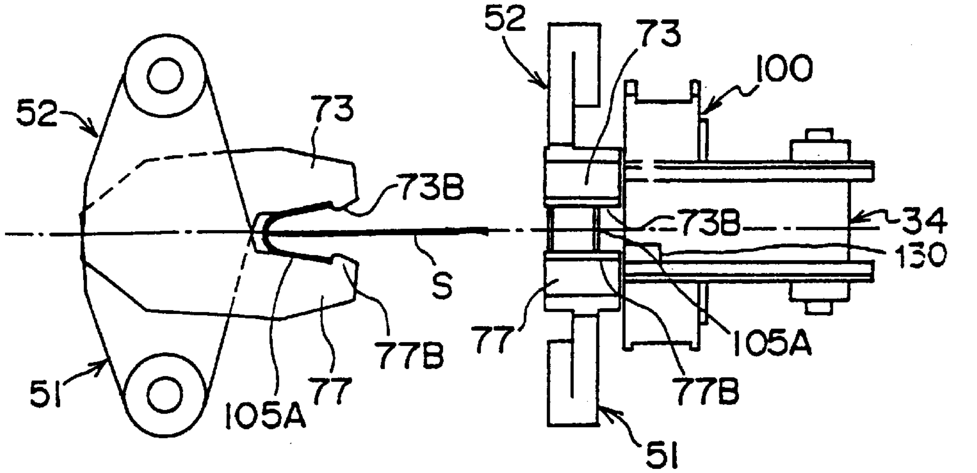
FIG. 37 is a descriptive drawing showing the relationship between the clamping member and the slider.

When the shaft 62 of the clamp pivotal member 53 comes into contact with the circumferential surface of the enlarging portion R4 of the driving cam 90 correspondingly to the rotation of the driving gear 85, the clamp pivotal members 53, 54 are pivoted counterclockwise on the shaft 63. Then, the clamp members 51, 52 are pivoted in a closing direction together with these pivotal motions, so that the clipping member 105A bent into the bell-crank shape can be bent further by the clamp portions 73, 77, as shown in FIG. 36. Sequently, when the shaft 62 of the clamp pivotal member 53 comes into contact with the circumferential surface of the enlarging portion R4 toward the large-radius portion R5 of the driving cam 90 as the driving gear 85 rotates further, the clamp members 51, 52 are pivoted further in the closing direction. Thereby, the clipping member 105A is bent and folded back by the clamp portions 73, 77, as shown in FIG. 37.

Figure 38:
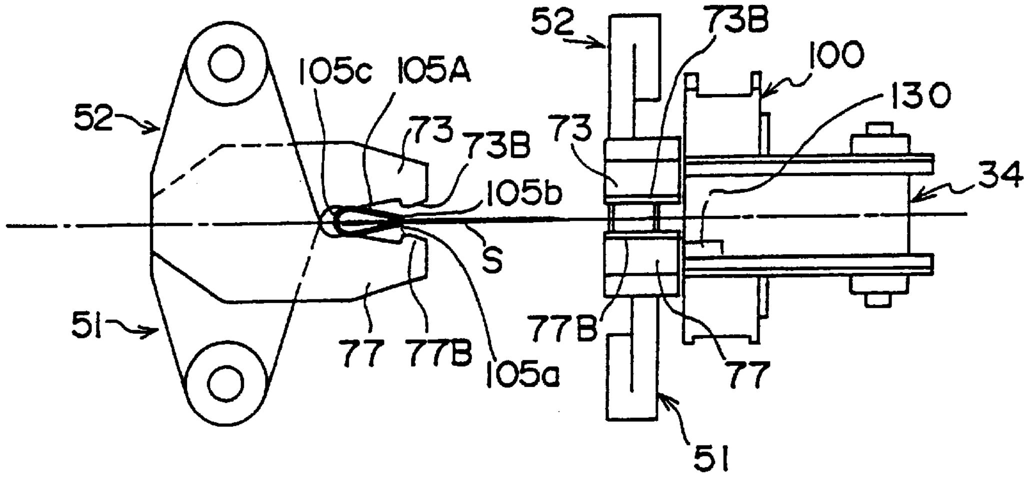
FIG. 38 is a descriptive drawing showing the relationship between the clamping member and the slider.

When the shaft 62 of the clamp pivotal member 53 reaches the circumferential surface adjacent to the boundary between the enlarging portion R4 of the driving cam 90 and the large-radius portion R5 thereof, the clamp portions 73, 77 are closed further. Thereby, as shown in FIG. 38, both ends 105*a*, 105*b* of the clipping member 105A are closed, so that the end of the sheets S can be held therebetween and also a bent portion 105*c* can be made circular-arc-shaped.

Figure 39:
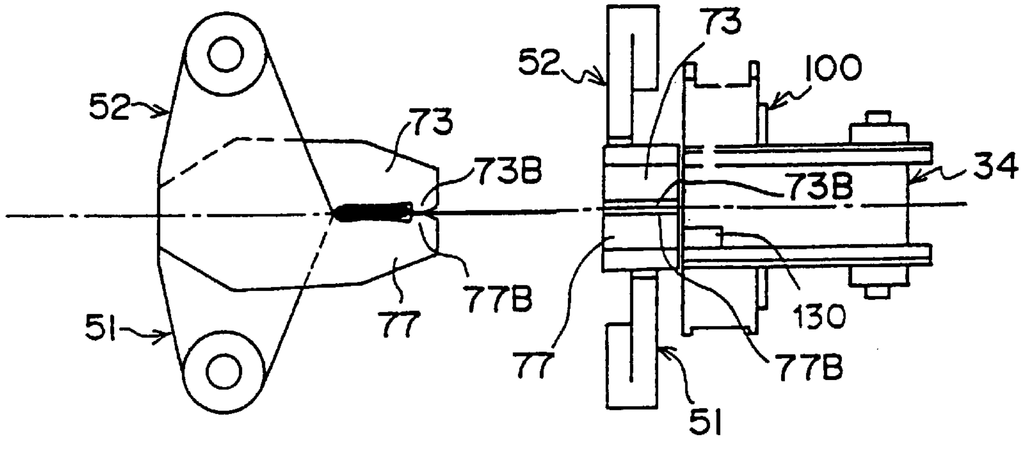
FIG. 39 is a descriptive drawing showing the relationship between the clamping member and the slider.
Figure 40:
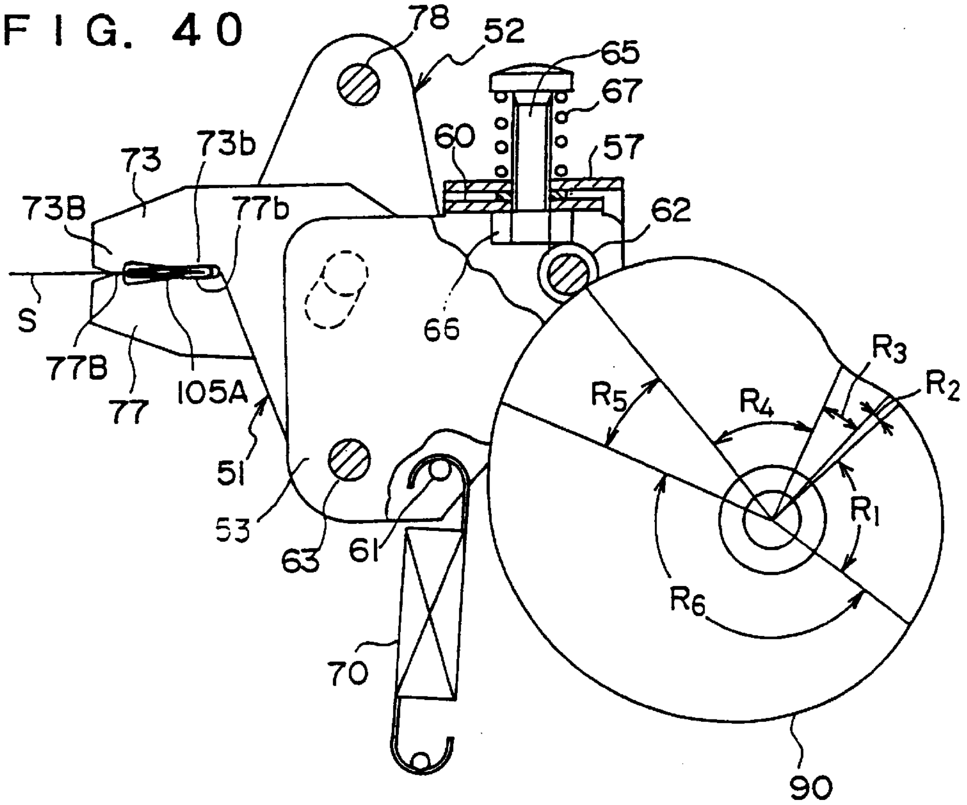
FIG. 40 is a descriptive drawing showing the relationship between the driving cam and the clamping member.

When the shaft 62 of the clamp pivotal member 53 reaches the circumferential surface of the large-radius portion R5 of the driving cam 90 correspondingly to the rotation of the driving gear 85, the clamp members 51, 52 are pivoted further in the closing direction. When the clamp members 51, 52 are pivoted in this way, the bent portion 105*c* of the clipping member 105A is tightly pressed by the swelled portions 73*b*, 77*b* of the clamp portions 73, 77, as shown in FIGS. 39 and 40. Accordingly, the end of the sheets S is fastened securely by the clipping member 105A.

The clamp portion 73 of the clamp member 51 is positioned above the shaft 63, and the clamp portion 77 of the clamp member 52 is positioned below the shaft 78. Therefore, as shown in FIG. 25, when the clamp members 51, 52 are pivoted in directions shown by arrows Q2, Q3, the clamp portions 73, 77 reaches a state of moving forward (leftward in FIG. 25), respectively, correspondingly to the rotation of the clamp members 51, 52. In other words, the clipping member 105A is bent while being pressed out forward by the clamp members 51, 52.

Therefore, as shown in FIGS. 35 to 39, the clipping member 105A is bent while the bent portion 105*c* thereof is being pressed on the end of the sheets S, so that the sheets S are prevented from being held only by both ends 105*a*, 105*b* of the clipping member 105A.

When the shaft 62 of the clamp pivotal member 53 comes into contact with the circumferential surface of the reducing portion R6 of the driving cam 90 interrelatedly with the rotation of the driving gear 85, the clamp pivotal members 53, 54 are pivoted clockwise on the shaft 63, and the clamp members 51, 52 are pivoted in the opening direction which is a reverse direction to the above-mentioned direction. When the shaft 62 of the clamp pivotal member 53 reaches the circumferential surface of the small-radius portion R1 of the driving cam 90, that is, when the driving gear 85 and the driving cam 90 make one rotation, the clamp members 51, 52 return to the home position shown in FIGS. 25 and 31, and thereby the driving motor 81 is stopped.

In this way, the clipping member 105A disposed inside the cartridge 100 is picked out by the slider 34 and then is delivered to the clipping position 13. Next, the clipping member 105A is bent to hold the sheets S by the clamp members 51, 52. Accordingly, a platelike member can be used as the clipping member 105 disposed inside the cartridge 100. As a result, many clipping members 105 can be disposed inside the cartridge 100 even though the width of the clipping members 105 is relatively large, and therefore it is not required to make a frequent exchange of the cartridges 100 and a frequent supplement of the clipping members 105.

Since the sensor 130 is attached to the slider 34, the sensor 130 continues to detect the clipping member 105 as long as the clipping member 105 is picked out of the cartridge 100 by the slider 34 and is delivered to the clipping position 13. In other words, the sensor 130 can accurately detect not only that the clipping member 105 is in the cartridge 100 but also that the clipping member 105 has been delivered to the clipping position 13. This detection beforehand prevents the fact that the sheets S are not fastened with the clipping member 105.

Next, there will be described a case where the number and thickness of the sheets S are larger.

Figure 41:
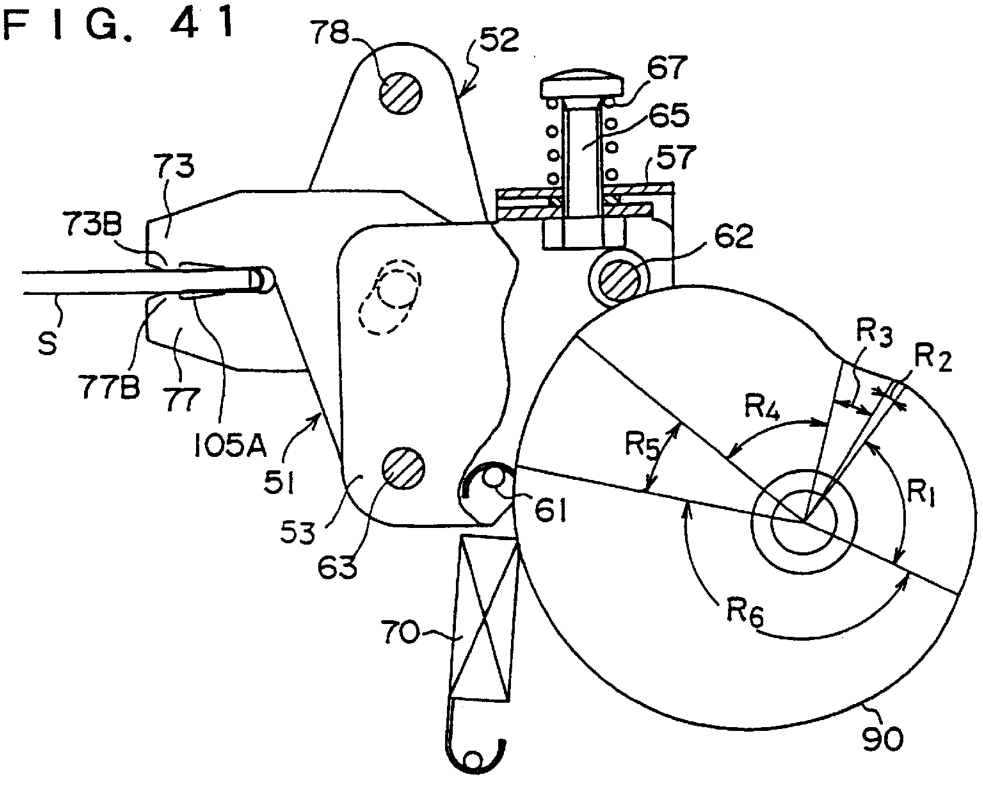
FIG. 41 is a descriptive drawing showing the relationship between the driving cam and the clamping member in a case where the thickness of sheets is large.
Figure 42:
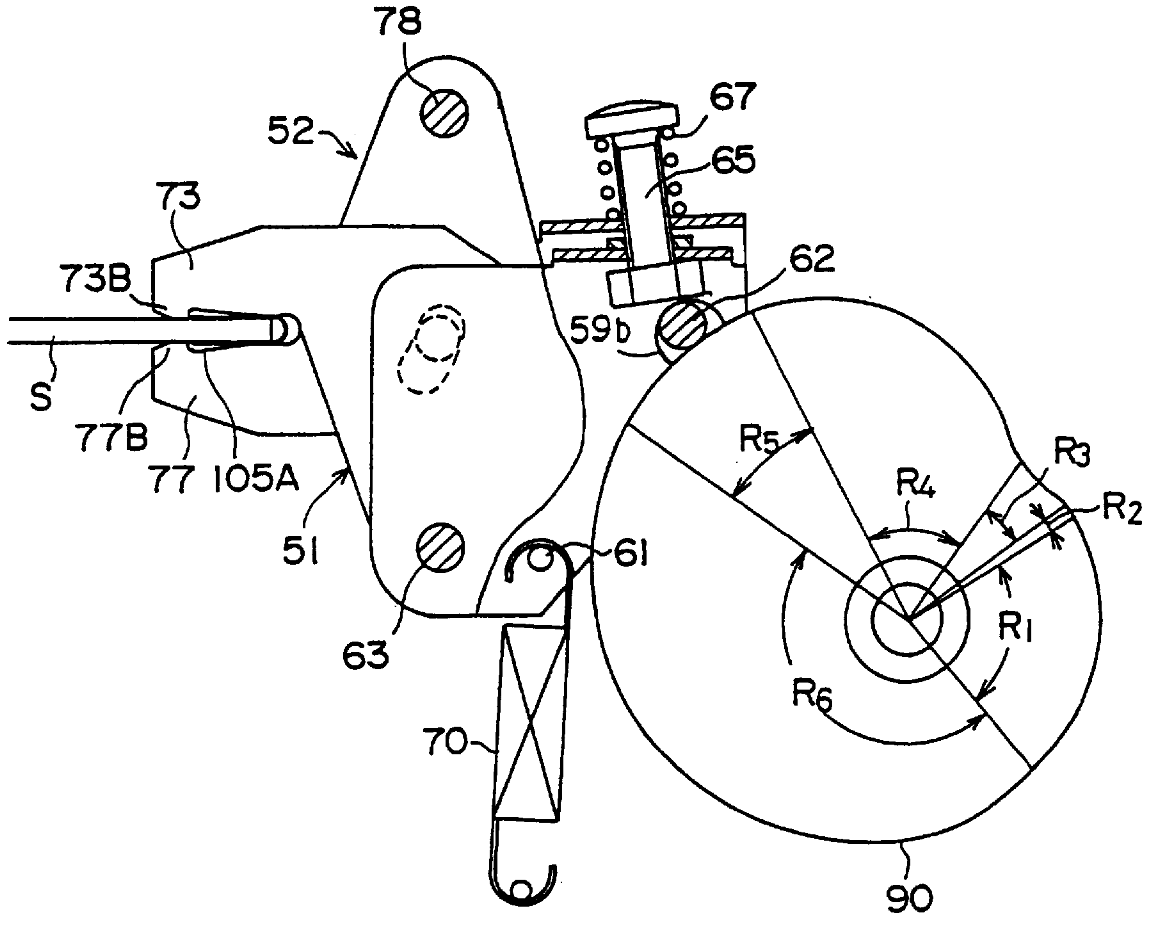
FIG. 42 is a descriptive drawing showing a mechanism for adjusting the thickness of the sheets.

In a case where the number and thickness of the sheets S are larger, as shown in FIG. 41, the pivotal motions of the clamp pivotal member 54 and the clamp members 51, 52 stop, and thereby the driving cam 90 is locked, while the shaft 62 of the clamp pivotal member 53 is in contact with the circumferential surface of the enlarging portion R4 of the driving cam 90. However, the clamp pivotal member 54 can be pivoted on the shaft 63 with respect to the clamp pivotal member 53. Therefore, when the spring 67 is bent according to the thickness of the sheets S and the clamp pivotal member 54 is displaced for the clamp pivotal member 53, the clamp pivotal member 53 is pivoted together with the rotation of the driving cam 90. Therefore, as shown in FIG. 42, the driving cam 90 can be prevented from being locked and can pivot without hindrance.

In the aforementioned embodiment, the clipping member 105 is disposed inside the containing chamber 101 of the cartridge 100. Instead, the clipping member 105 may be disposed directly inside the cartridge chamber 12.

Embodiment 2

Figure 43:
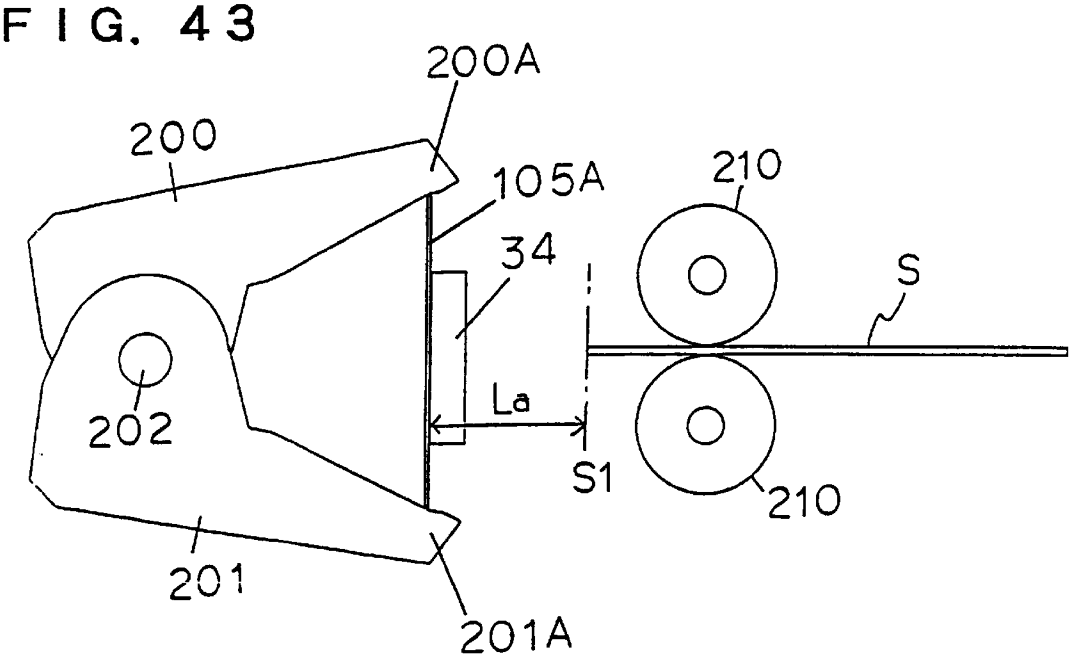
FIG. 43 is a descriptive drawing showing a state where a clamp holds a clipping plate after sheets S have been carried toward the clipping plates by means of a pair of rollers.
Figure 44:
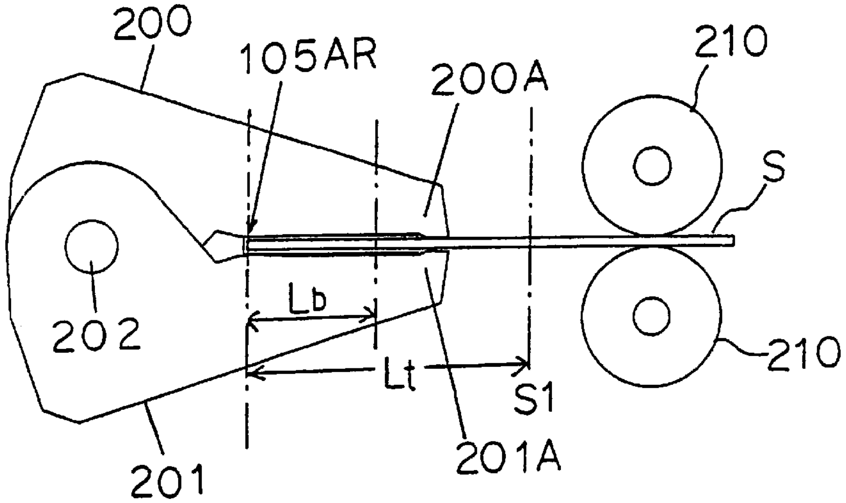
FIG. 44 is a descriptive drawing showing a state where the clamp is closed to fasten the sheets S together with the clipping plate after the sheets S have been carried toward the clipping plate by the pair of rollers.
Figure 45:
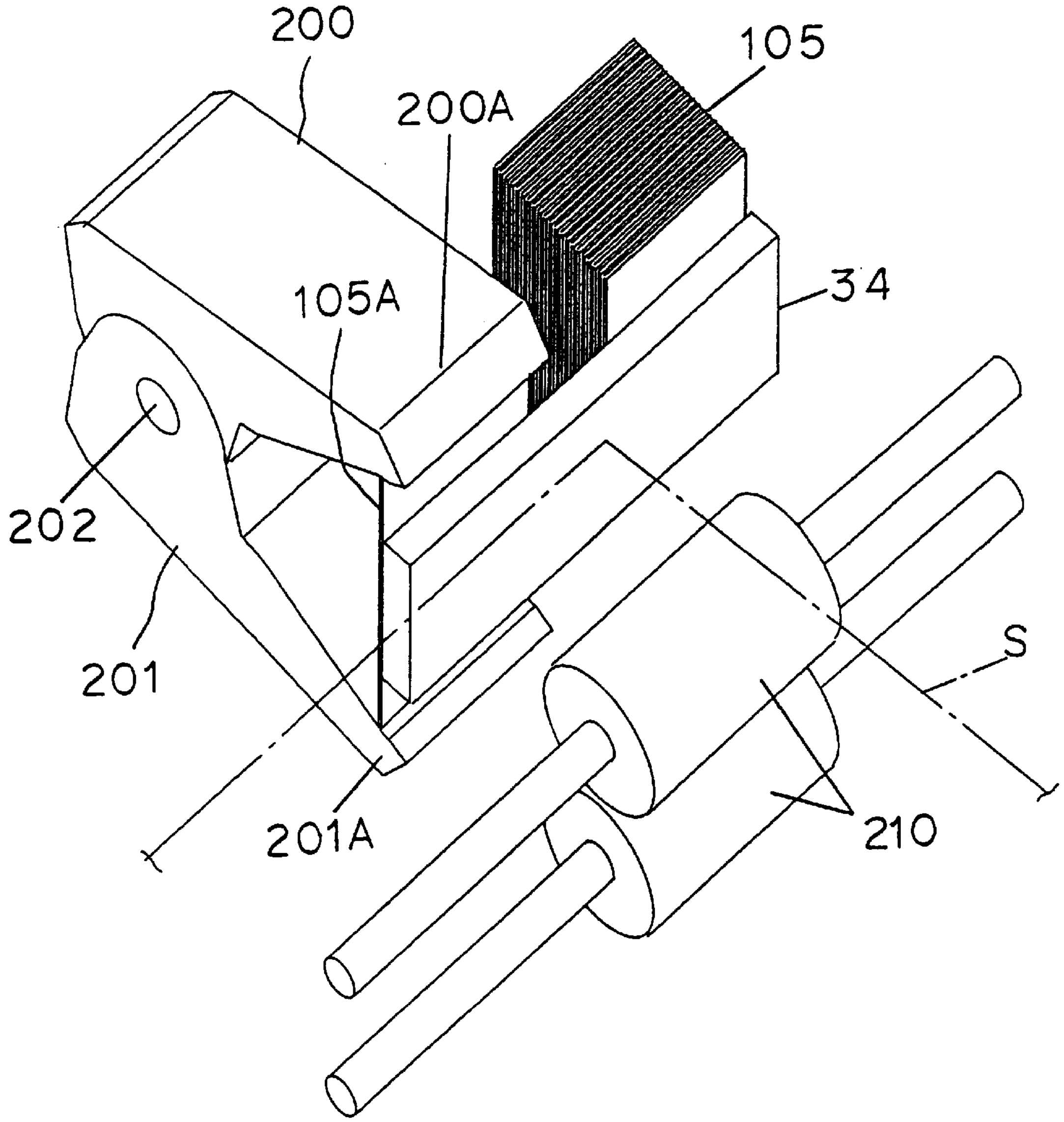
FIG. 45 is a perspective view showing a state where the clipping plate is caught by the end parts of the clamp which is kept open and the sheets S are carried by the pair of rollers.

In FIGS. 43 to 45, a clamping mechanism is shown according to a second embodiment. The clamping mechanism is constructed to move the end to be fastened of the sheets S toward the clipping member 105A by a pair of rollers.

This clamping mechanism is different from the clamping mechanism 50. In more detail, clamp members 200, 201 are different in construction from the clamp members 51, 52. In the clamping mechanism according to the second embodiment, the clamp members 200, 201 have a plier type of construction and are held pivotably on a shaft 202, and ends 200A, 201A of the clamp members 200, 201 perform an opening and closing motion on the shaft 202. For example, the pivotal motions of the clamp members 200, 201 are performed such that a lever is attached to one end of each of the clamp members 200, 201 (a left end in FIG. 43), and an opening and closing motion of the lever is performed by a link mechanism, a cam mechanism, or the like.

A pair of delivering rollers (pressing means) 210, 210 for delivering the sheets S are disposed on the side opposite to the ends 200A, 201A of the clamp members 200, 201. The sheets S are delivered from the side of, for example, the copying machine body to the part between the delivering rollers 210, 210.

When the ends 200A, 201A of the clamp members 200, 201 are closed, the sheets S are delivered toward a bent portion 105AR of the clipping member 105A held on the clamp members 200, 201 by the delivering rollers 210, 210.

Ends to be fastened of the sheets S are trued up by, for example, a case plate or a plate shaft before the sheets S are held between the delivering rollers 210, 210. Thereafter, the sheets S wait in a standby position S1 while being held between the delivering rollers 210, 210. The end to be fastened of the sheets S held between the delivering rollers 210, 210 is spaced away at a distance La from the clipping member 105A. When the clipping member 105A is bent by the clamp members 200, 201, the bent portion 105AR of the clipping member 105A retreats by Lb from the initial position. Thereby, a delivery distance Lt of the delivering rollers 210, 210 becomes La+Lb.

When the clipping member 105A is delivered by the slider 34 and is caught by the clamp members 200, 201, and then the slider 34 returns to the home position, the sheets S are delivered toward the clipping member 105A by the delivering rollers 210, 210.

This delivering operation is performed such that the sheets S are delivered according to a state where the clipping member 105A is bent by the clamp members 200, 201, and, when the clipping member 105A is bent as shown in FIG. 44, the end of the sheets S is brought into contact with the bent portion 105AR of the clipping member 105A interrelatedly with the closing operation of the clamp members 200, 201.

Embodiment 3

Figure 46:
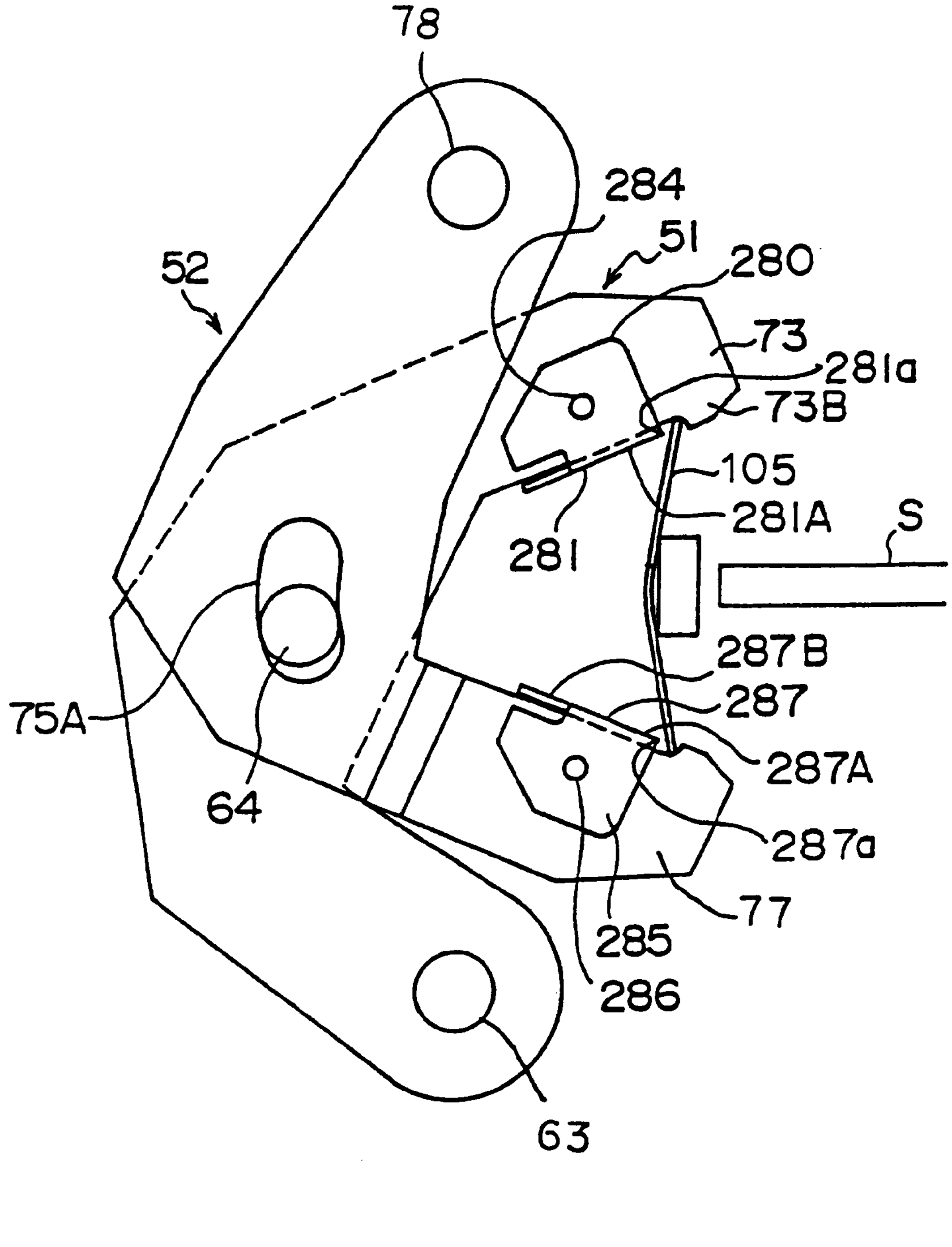
FIG. 46 is a descriptive drawing showing the clipping plate bent in a V-shape by the clamping member.
Figure 47:
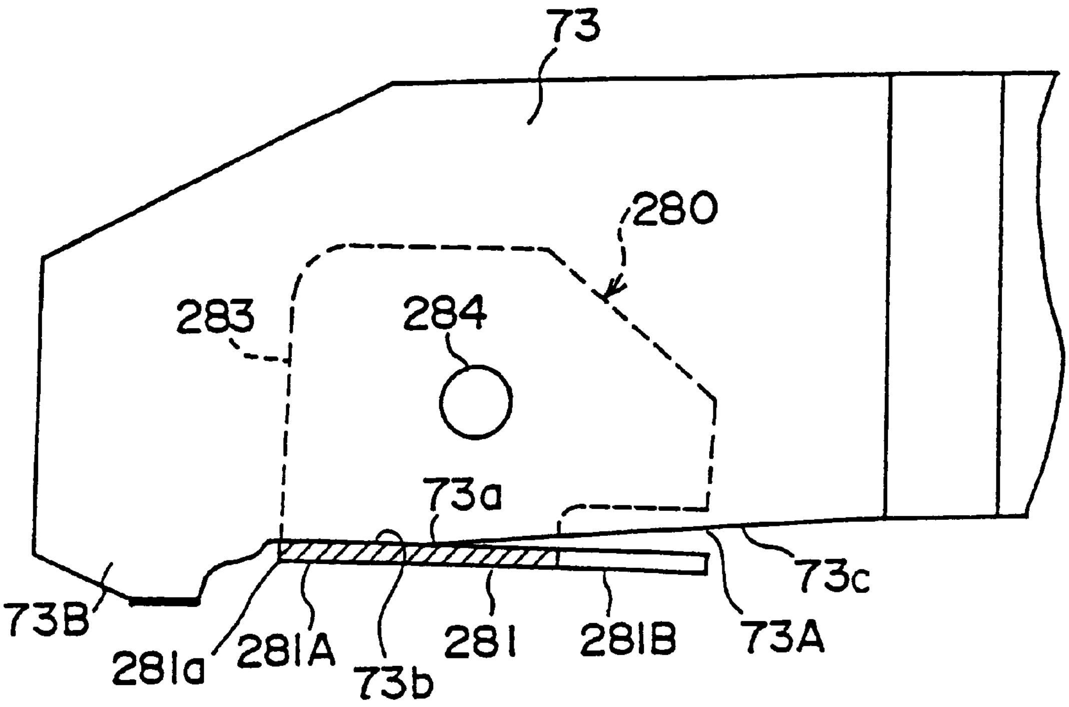
FIG. 47 is a descriptive drawing showing a pressing member attached to the clamping member.
Figure 48:
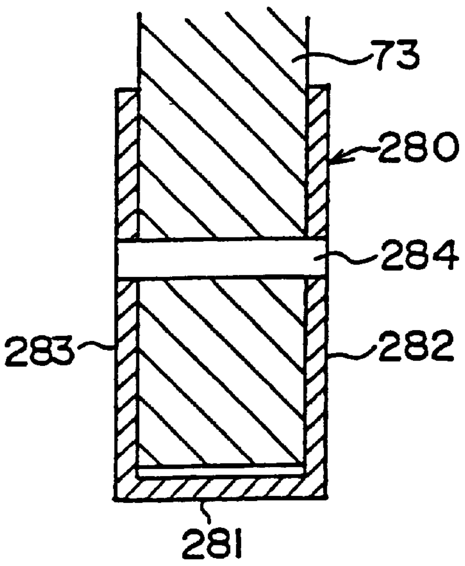
FIG. 48 is a descriptive drawing showing the pressing member which has been pivoted.
Figure 49:
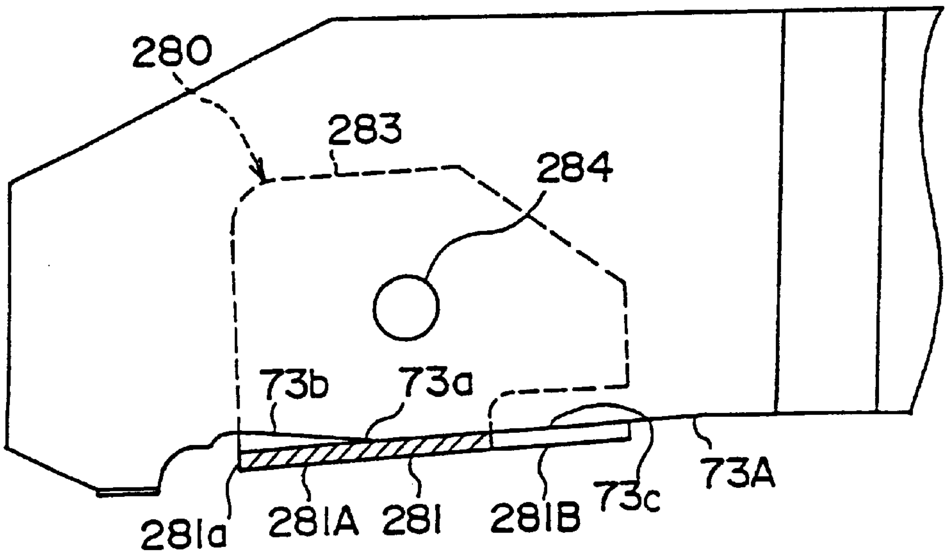
FIG. 49 is a sectional view showing the construction of the pressing member.

FIGS. 46 to 49 show the clamp members 51, 52 according to a third embodiment. The under surface (clamp surface) 73A of the clamp portion 73 of the clamp member 51 is provided, as shown in FIGS. 47 to 49, with inclined surfaces 73*b*, 73*c* which are slightly inclined in the right and left directions from a top portion 73*a*.

Figure 50:
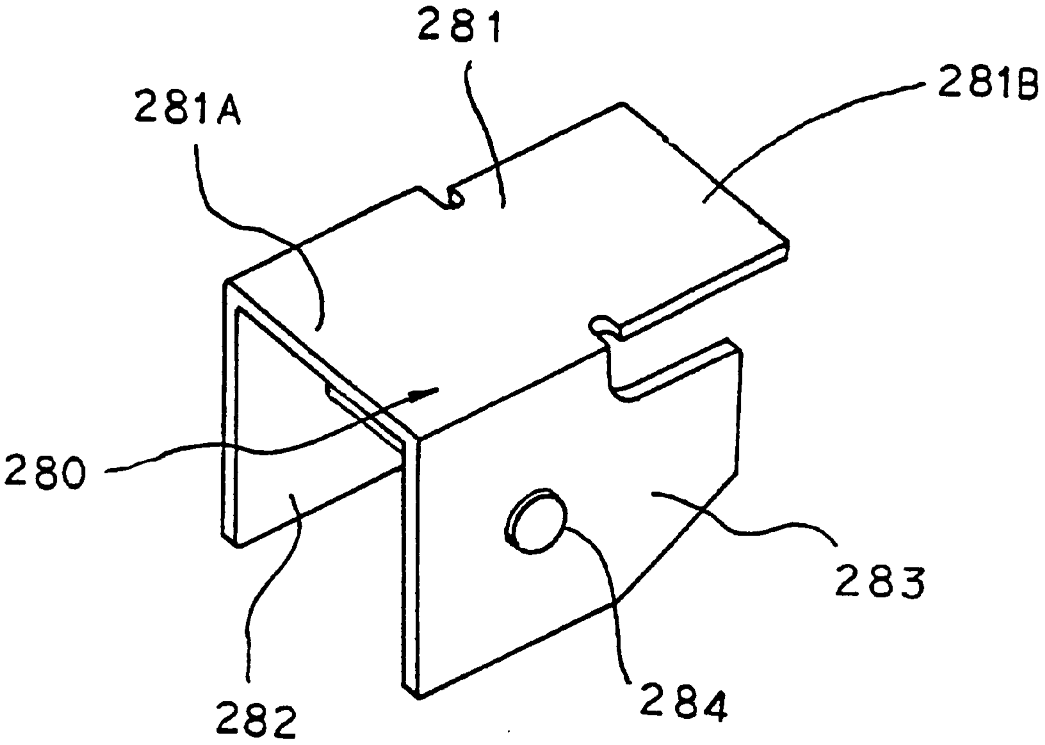
FIG. 50 is a perspective view of the pressing member.

As shown in FIG. 50, a pressing member (swaying member) 280 having a U-shaped section is attached to the clamp portion 73. The pressing member (swaying member) 280 consists of a platelike pressing portion (pressing surface) 281 and platelike attachment portions 282, 283 extending from both sides of the pressing portion 281. A shaft 284 attached to the attachment portions 282, 283 penetrates the clamp portion 73. As shown in FIGS. 47 to 49, the pressing member 280 is designed to be pivoted on the shaft 284 such that a front portion 281A of the pressing portion 281 comes into contact with the inclined surface 73*b* of the clamp portion 73, or a back portion 281B of the pressing portion 281 comes into contact with the inclined surface 73*c* of the clamp portion 73.

When the back portion 281B of the pressing portion 281 comes into contact with the inclined surface 73*c* of the clamp portion 73, a state is reached in which a front-end portion 281*a* of the pressing portion 281 projects downward.

The upper surface 77A of the clamp portion 77 of the clamp member 52 is provided with a top portion (not shown) similar to the top portion 73*a* of the clamp portion 73 and inclined surfaces (not shown) similar to the inclined surfaces 73*b*, 73*c* thereof. A pressing member 285 similar to the pressing member 280 is attached to the clamp portion 77 of the clamp member 52 so as to be pivoted on the shaft 284, and a front-end portion 287*a* of a pressing portion 287 is kept projecting upward in the same way as mentioned above.

Figure 51:
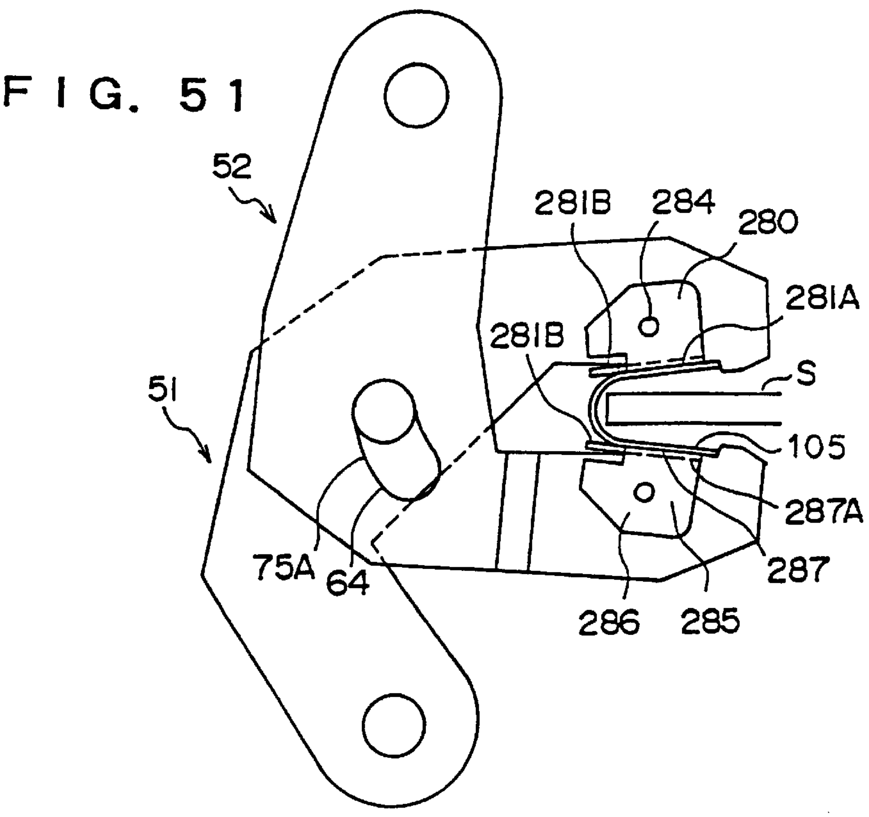
FIG. 51 is a descriptive drawing showing the clipping plate bent in a twofold state by the clamping member.

When the clamp members 51, 52 are pivoted on the shafts 63, 78, the clamp portions 73, 77 are closed, and then, as shown in FIG. 46, the clipping member 105 is bent into the bell-crank shape while being pushed out forward. Sequently, as shown in FIG. 51, when the clipping member 105 is bent in a state of being folded back by the clamp portions 73, 77, the front portion 281A of the pressing portion 281 of the pressing member 280 comes into contact with the inclined surface 73*b* of the clamp portion 73 (see FIG. 47). The pressing member 285 also reaches the same state.

Figure 52:
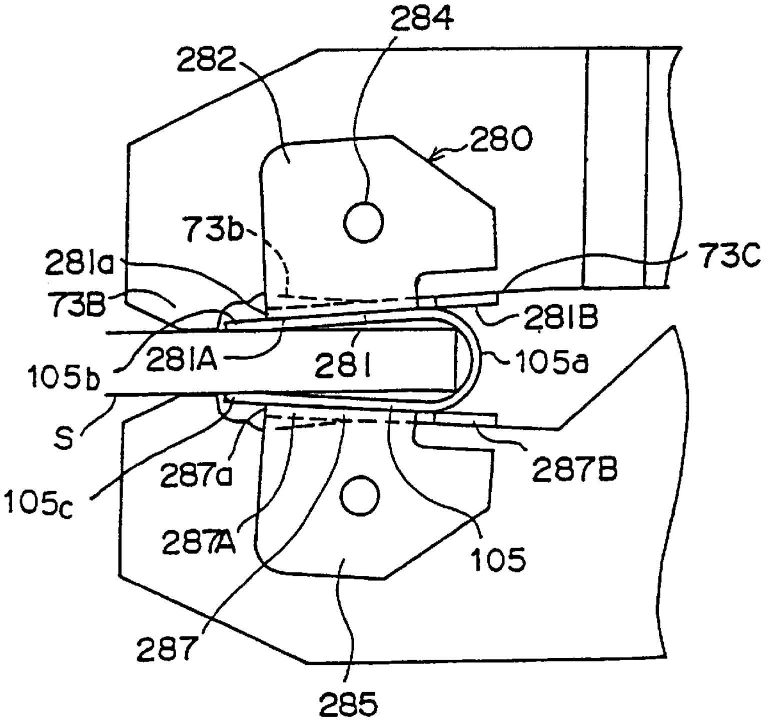
FIG. 52 is a descriptive drawing showing the relationship between the clipping plate which has been bent and the pressing member.

When the clamp portions 73, 77 are closed more, as shown in FIG. 52, the back portion 281B of the pressing portion 281 of the pressing member 280 is brought into contact with the inclined surface 73*c* of the clamp portion 73 by means of a bent portion 105*a* of the clipping member 105. Therefore, a state is reached in which the front-end portion 281*a* of the pressing portion 281 projects downward. In the same way, a state is reached in which the front-end portion 287*a* of the pressing portion 287 of the pressing member 285 projects upward.

Hence, since the bent portion 105*a* of the clipping member 105 is tightly pressed by the clamp members 51, 52 via the pressing portions 281, 287 in a state where both ends 105*b*, 105*c* of the clipping member 105 are pressed from above and below by the front-end portions 281*a*, 287*a* of the pressing members 280, 285, the clipping member 105 is bent while clinging to the sheets S so as to clamp the sheets S. Therefore, both ends 105*b*, 105*c* of the clipping member 105 are prevented from separating from the sheets S, and the sheets S can be clamped and fastened precisely.

Figure 53:
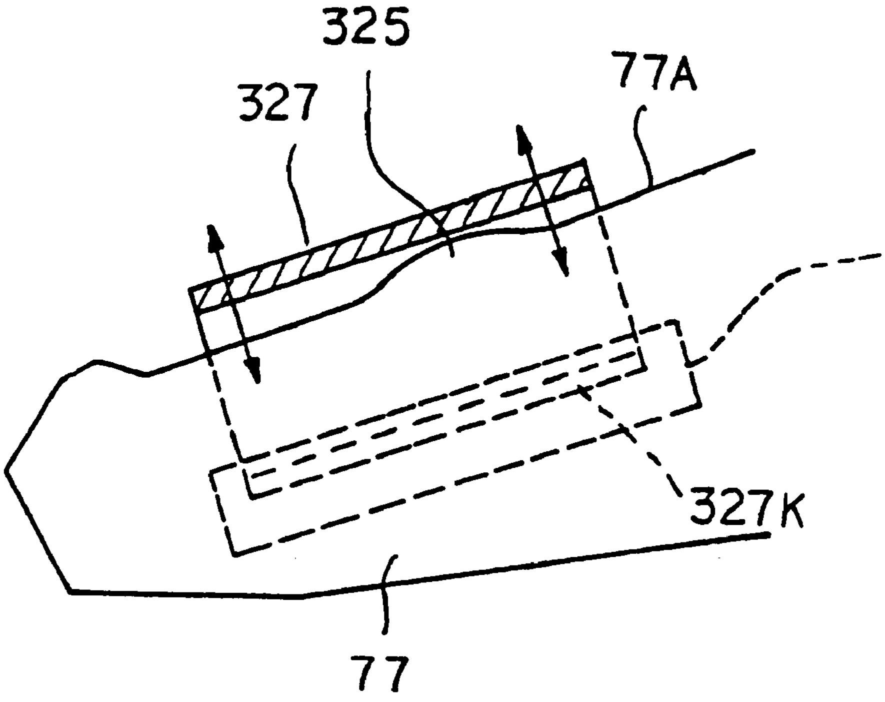
FIG. 53 is a descriptive drawing showing another example of the pressing member.

As shown in FIG. 53, instead of the shaft 284 which gives support to a pressing member 327, use may be made of a construction where a groove 326 extending in the longitudinal direction of each of the clamp portions 73, 77 is formed on both sides of the clamp portions 73, 77, and a hooking portion 327K formed on both sides of the pressing member 327 is then engaged with the groove 326 so that the pressing member 327 can be swayed, or a construction where a convex 325 is formed in the clamp surfaces 73A, 77A of the clamp portions 73, 77, and the pressing member 327 is swayed on the convex 325.

Figure 54:
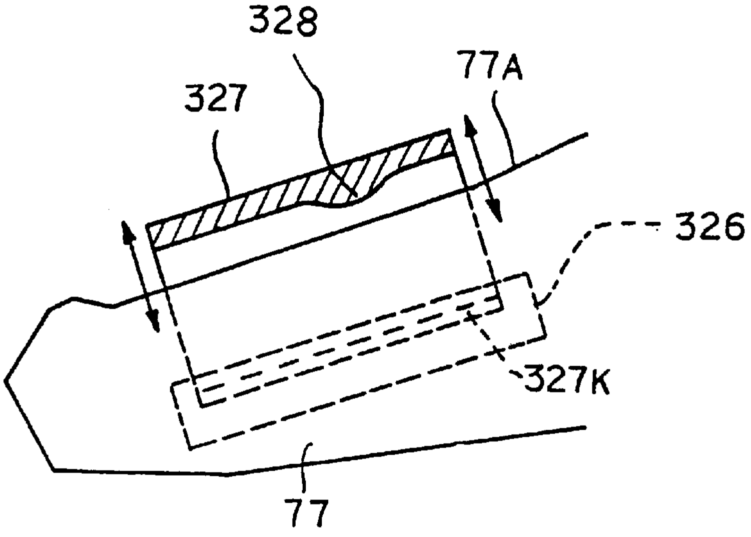
FIG. 54 is a descriptive drawing showing still another example of the pressing member.
Figure 55:
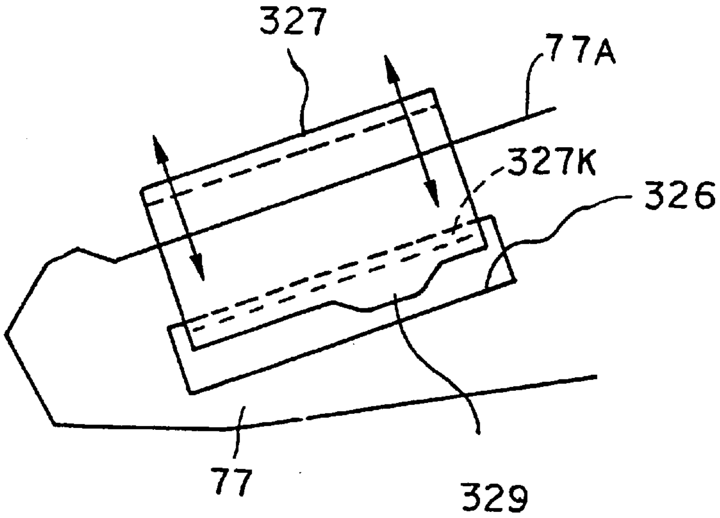
FIG. 55 is a descriptive drawing showing still another example of the pressing member.

Additionally, as shown in FIGS. 54 and 55, instead of the convex 325, projections 328. 329 may be formed in the pressing portion 327A of the pressing member 327 or in the hooking portion 327K thereof.

Embodiment 4

Figure 56:
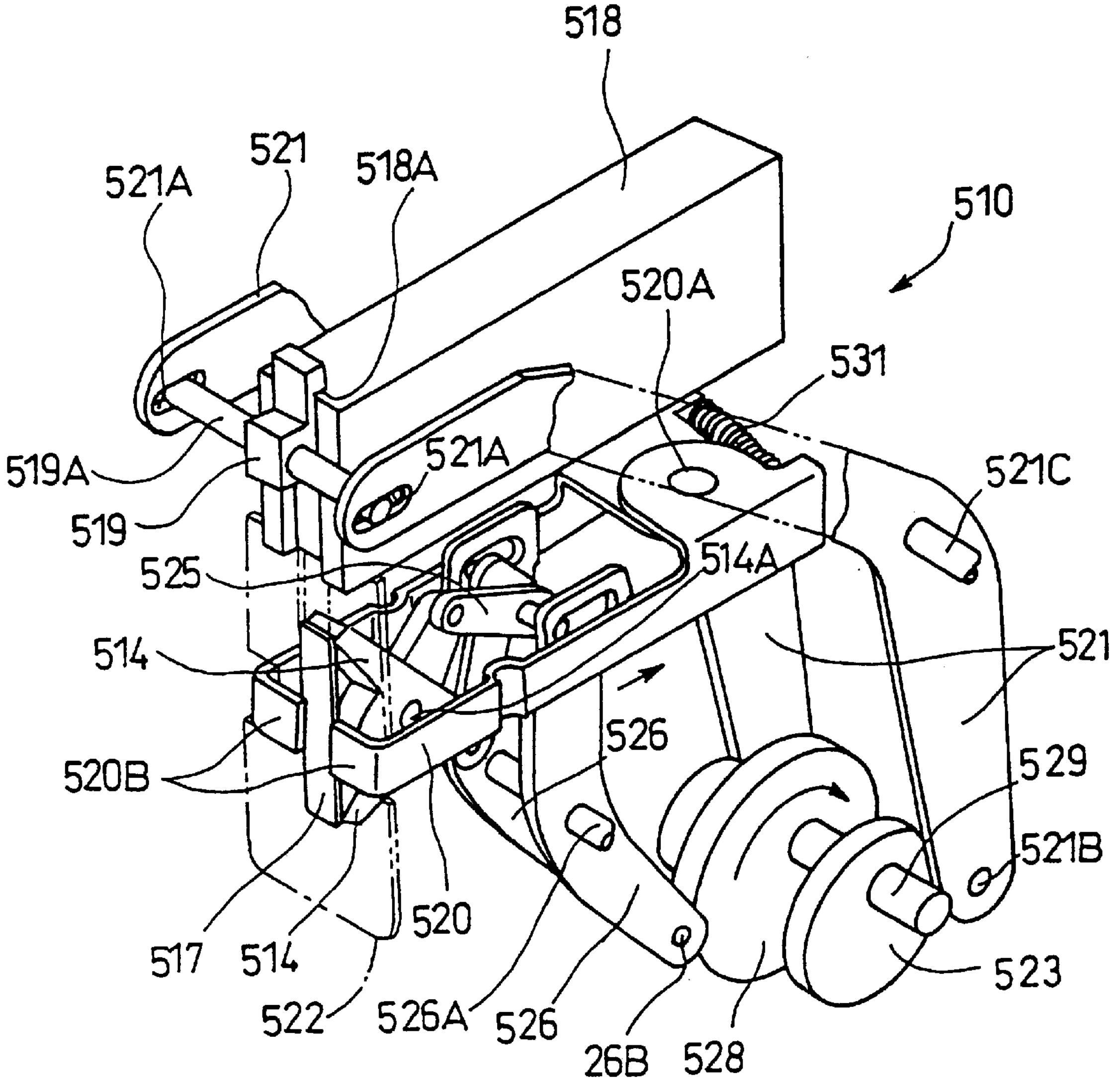
FIG. 56 is a perspective view showing a general construction of a clipping apparatus according to a fourth embodiment.
Figure 58:
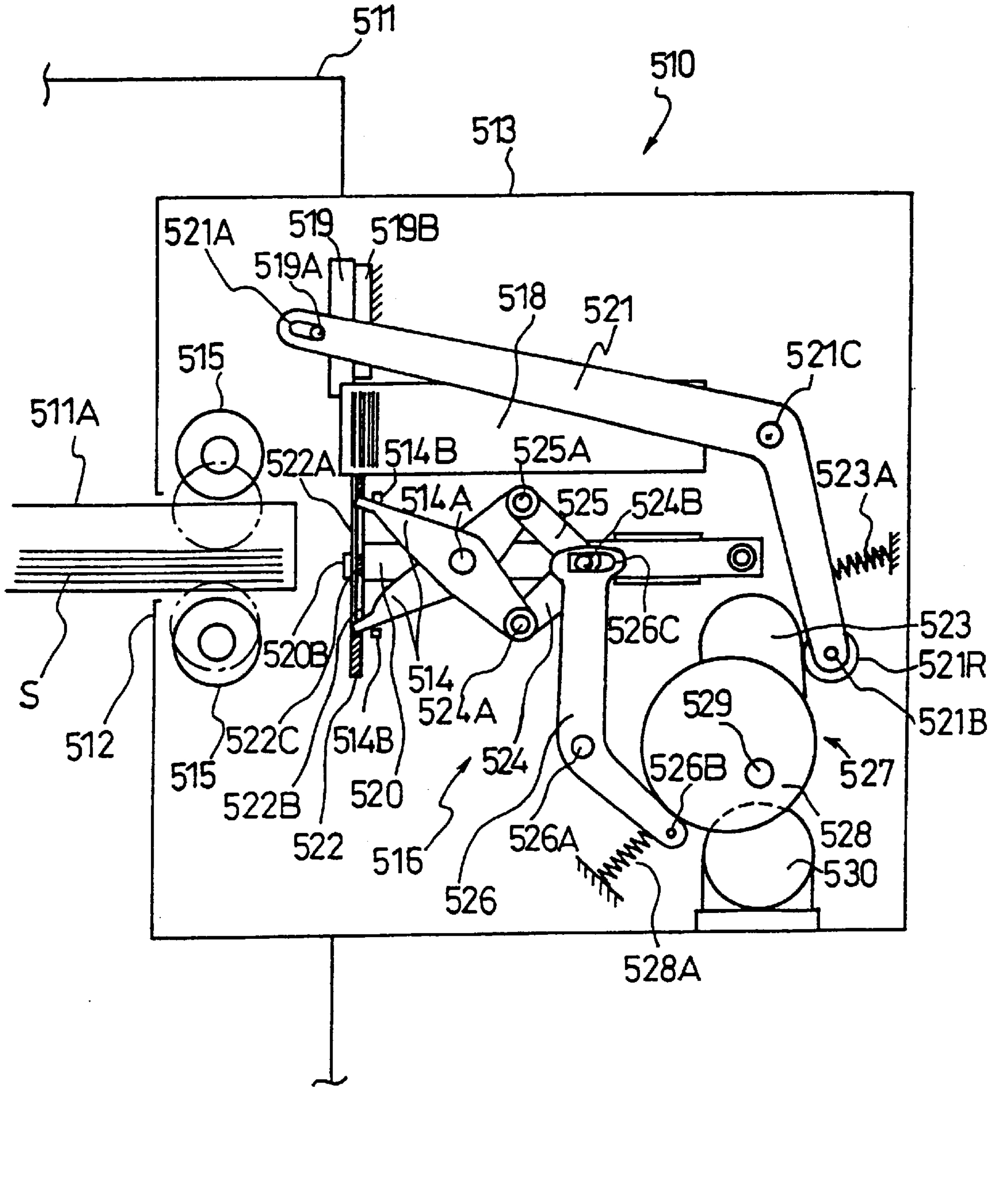
FIG. 58 is a schematic drawing showing the positional relationship between the clipping apparatus and a copying machine body.

FIG. 56 is a schematic view of a construction of a clipping apparatus according to a fourth embodiment. As shown in FIG. 58, this clipping apparatus 510 is installed around, for example, an outlet 511A disposed in a side wall portion of a copying machine body 511, and the end of the sheets S used as a sheet member discharged from the outlet 511A comes into an opening portion 512 provided for the clipping apparatus 510.

Inside of a housing 513 of the clipping apparatus 510, there are disposed a pair of rollers 515, 515 which deliver sheets S of copying paper to the side of clamp members 514, 514 and to the initial position while holding the end of the sheets S of copying paper, a clamp opening-and-closing mechanism 516 for performing an opening and closing motion of the clamp members 514, 514, a cartridge 518 which contains a clipping member 517, a slider 519 which picks the clipping member 517 out of the cartridge 518 and delivers it to the front surfaces of the clamp members 514, 514, and bending guides 520 each of which comes into contact with the front surface of the clipping member 517 delivered to the front surfaces of the clamp members 514, 514.

A pair of rollers 515, 515 approach each other to hold the sheets S of copying paper. This operation is performed according to a clipping signal output by the copying machine body 511 when a predetermined number of sheets S of copying paper are discharged from the outlet 511A of the copying machine body 511. After the clamp members 514, 514 have completed the bending of the clipping member 517, the rollers 515, 515 discharge the sheets S of copying paper toward the copying machine body 511 and then move away from each other again.

The cartridge 518 is disposed above the pair of clamp members 514, 514. The cartridge 518 contains many clipping members 517 stacked in the longitudinal direction of the cartridge 518. The clipping members 517 in the cartridge 518 are pressed toward the front surface of the cartridge 518 by the force of a spring (not shown). An opening portion 518A for pulling the clipping member 517 downward is formed in the front surface of the cartridge 518, and part of the slider 519 comes into the opening portion 518A. The slider 519 is disposed movably upward and downward along the opening portion 518A.

When the slider 519 moves downward from a position shown in FIG. 58, the clipping member 517 is picked out of the cartridge 518 and is delivered to a front-surface position (a clipping position) of the clamp members 514, 514.

The slider 519 moves upward and downward by link levers 521. The link levers 521 are supported on a shaft 521C so that the slider 519 is swayed according to the rotation of a cam 523. As shown in FIG. 58, a long hole 521A is formed in an end part of each link lever 521, and both end parts of a shaft portion 519A attached to the slider 519 are held movably along the long hole 521A. A pin 521B is formed in the lower end part of each link lever 521, and a roller 521R is attached rotatably to the pins 521B. The roller 521R is in contact with the cam 523.

The link lever 521 is pressed clockwise by the force of a pressed spring 523A, and thereby the cam 523 is kept in contact with the roller 521R. Reference character 519B denotes a guide along which the slider 519 is guided in up and down directions. This guide 519B is fixed to a frame (not shown) of the housing 513.

Figure 59A:
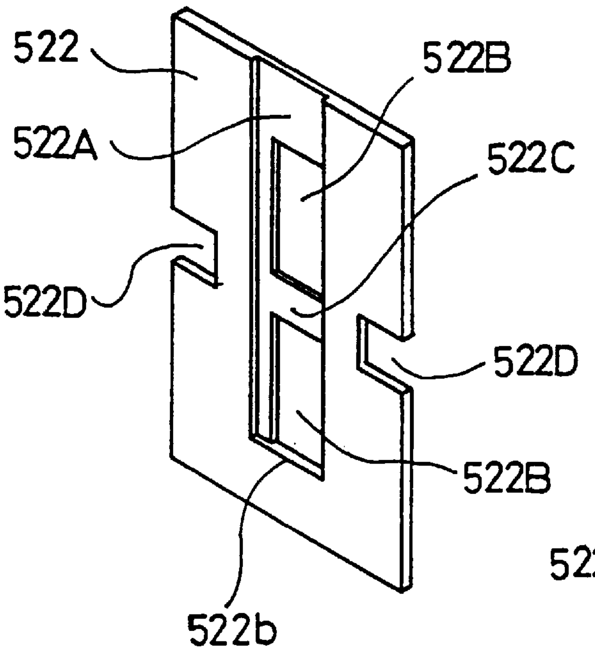
FIG. 59(A) is a perspective view of a guiding plate.
Figure 59B:
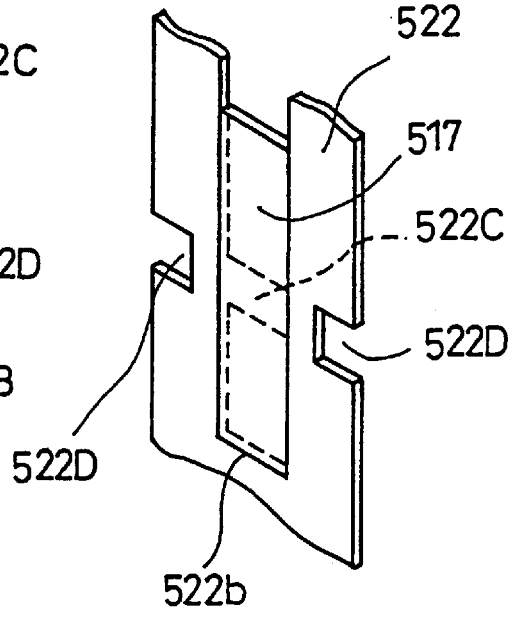
FIG. 59(B) is a perspective view of the guiding plate and a clipping member inserted in a guiding groove thereof.

A guide plate 522 is attached to the front part of the clamp members 514, 514, and, as shown in FIGS. 59(A) and 59(B), the guide plate 522 is provided with a guide groove 522A along which the clipping member 517 is guided sliding from above to below, and opening portions 522B, 522B through which the ends of the clamp members 514, 514 pass. Reference character 522C denotes a wall.

The clipping member 517 hooked up to the slider 519 is guided along the guide groove 522A. An edge portion 522*b* of the lower end of the guide groove 522A serves as a contact surface which comes into contact with the lower end surface of the clipping member 517 so that the clipping member 517 can be kept in a clipping position. Concave portions 522D, 522D through which front end portions 520B of the bending guides 520 go in and out are formed in the right and left middle parts of the guide plate 522.

As shown in FIG. 56, immediately after the clipping member 517 has been delivered to the front-surface side of the clamp members 514, 514, the slider 519 moves upward to the initial position (a position shown in FIG. 58) and waits there.

The pair of clamp members 514, 514 are pivoted on a shaft 514A, and a clamp opening-and-closing mechanism 516 is attached to the rear ends of the clamp members 514, 514. The clamp members 514, 514 are opened and closed by the clamp opening-and-closing mechanism 516. The pair of clamp members 514, 514 are designed to projects from the opening portions 522B, 522B of the guide plate 522 while being closed, and thus bend the clipping member 517. Reference character 514B denotes a stopper with which the clamp members 514, 514 are prevented from being opened more than a predetermined angle.

The clamp opening-and-closing mechanism 516 is made up of link levers 524, 525, and 526, and a cam mechanism 527. The clamp members 514, 514 are connected to the link levers 524, 525 via pins 524A, 525A, respectively. The link levers 524, 525 are connected to the link lever 526 via a pin 524B. The link lever 526 is swayed on a shaft 526A and is pressed counterclockwise by the force of a pressed spring 528A attached to a frame so as to come into contact with a cam 528. A long hole 526C is formed in the upper end part of the link lever 526, and the pin 524B is inserted in the long holes 526C. When the link lever 526 is pivoted clockwise by means of the long holes 526C, the clipping member 517 can be held in a state where the clamp members 514, 514 are opened during a fixed time.

The cam mechanism 527 is provided with a rotational shaft 529. The rotational shaft 529 is rotated via a gear mechanism by a motor 530. The cams 523, 528 are fixed to the rotational shaft 529. Pins 52 1B, 526B which are always in contact with the cams 523, 528 are attached to the link levers 521, 526, respectively.

The bending guides 520 are disposed on the right and left sides of the clamp members 514, 514 and are held on a shaft 520A so that the front end portions 520B thereof can be opened and closed. When the clamp members 514, 514 are closed, the front end portions 520B of the bending guides 520 comes into contact with the front surface of the clipping member 517, and thereby the clipping member 517 can be bent leftward (in FIG. 56).

Figure 57:
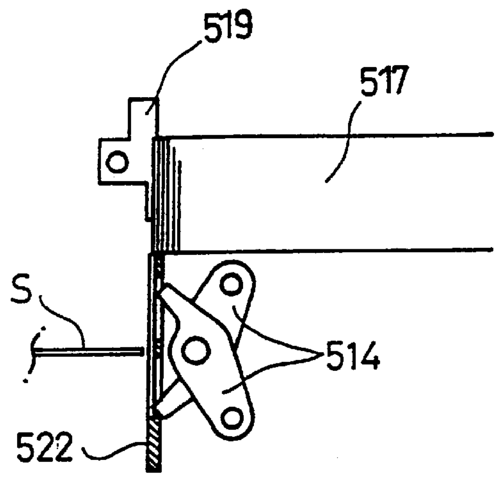
FIGS. 57(A)–57(D) show the transition of the slider and the clamp from a state to another state.
Figure 57:
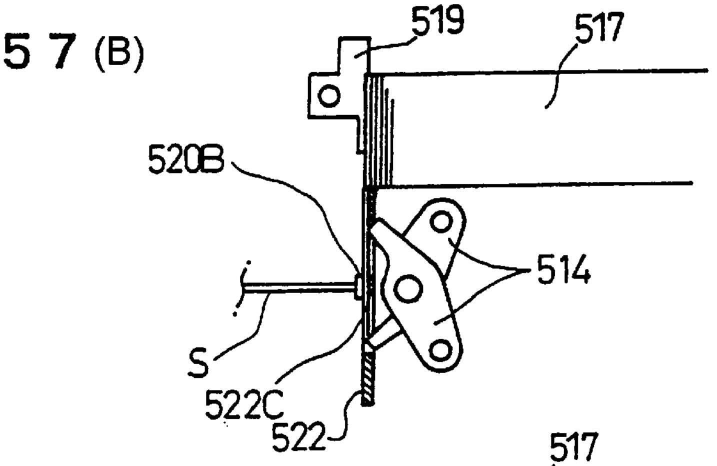
Figure 57:
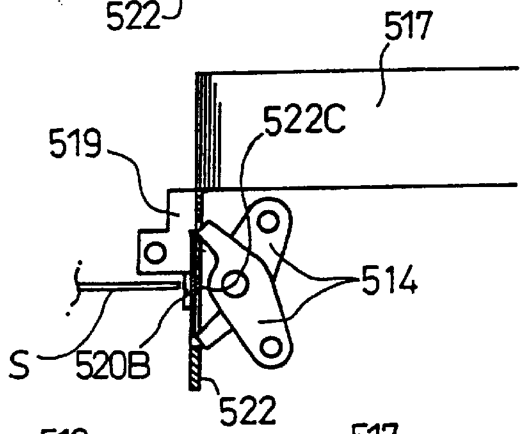
Figure 57:
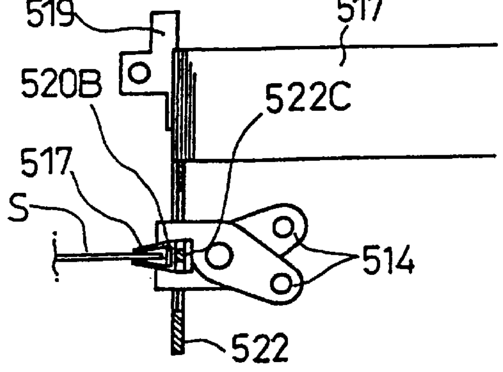

According to this embodiment, when the ends of the clamp members 514, 514 are closed, the upper and lower parts of the clipping member 517 are pressed forward by the closed ends, and the clipping member 517 is bent. As shown in FIG. 57(D), when the clipping member 517 is bent by the clamp members 514, 514, the front end portions 520B of the bending guides 520 are opened by, for example, a solenoid (not shown), and then are spaced away from the bent part of the clipping member 517. Sequently, the clamp members 514, 514 are completely closed, and the bent part of the clipping member 517 is tightly pressed, and the clipping of the sheets S of copying paper is completed.

Thereafter, the clamp members 514, 514 are released and the rollers 515, 515 are reversed, and thereby the clipped sheets S of copying paper are moved to the middle side of the outlet 511A of the copying machine body 511 and then are delivered to a stack tray.

A spring 531 is laid between the rear end parts of the bending guides 520, and the front end portions 520B, 520B of the bending guides 520 are always pressed in a direction in which they approach each other by the force of the spring 531. The front end portions 520B, 520B of the bending guides 520 are kept opened until the clipping member 517 is delivered by the slider 519. While the clamp members 514, 514 are being closed, the front end portions 520B, 520B are closed, and, when the clamp members 514, 514 are closed up to a predetermined position, the front end portions 520B, 520B are opened. The opening and closing operation of the bending guides 520 is performed interrelatedly with the cam mechanism 527 by means of a link mechanism (not shown).

[OPERATION]

Next, the operation of this clipping apparatus 510 will be described briefly.

First, a state prior to copying from the original into a sheet S of copying paper plural times and stacking a predetermined number of sheets S of copying paper on the stack tray will be defined as an initial state of the clipping apparatus 510. In the initial state, as shown in FIG. 57(A), the front ends of the clamp members 514, 514 are kept opened, and the slider 519 is kept waiting at the upper part of the opening portion 518A of the cartridge 518, and the front end portions 520B of the bending guides 520 are kept spaced away from each other.

When copying into the predetermined number of sheets S is completed and the sheets S are stacked on the stack tray, a clipping signal is output by the copying machine body 511. Thereby, the rollers 515, 515 hold the ends of the stacked sheets S therebetween and thereafter rotate to deliver the sheets S to the side of the clamp members 514, 514 (see FIGS. 57(A), 57(B), and 58).

After the sheets S of copying paper have been delivered by a predetermined distance toward the side of the clamp members 514, 514 by means of the rollers 515, 515, the link lever 521 is swayed, and thus the slider 519 begins to move downward according to the rotation of the cam 523. The clipping member 517 is then picked out of the cartridge 518 according to the downward movement of the slider 519, and is delivered to the front surfaces of the clamp members 514, 514, as shown in FIGS. 57(C) and 56.

Thereafter, the slider 519 moves upward and waits at the upper part of the opening portion 518A of the cartridge 518. On the other hand, the front end portions 520B of the bending guides 520 approach each other and are positioned on the front surface of the clipping member 517 according to the upward movement of the slider 519.

The front end parts of the clamp members 514, 514 are closed according to the swaying of the link lever 526. Since the front end portions 520B of the bending guides 520 are positioned on the front surface of the clipping member 517, as shown in FIG. 57(D), the clipping member 517 is bent according to the closing movement of the clamp members 514, 514.

The bending guides 520 are opened before the clamping force of the clamp members 514, 514 which is applied to the front end portions 520B of the bending guides 520 becomes too strong to pull out the bending guides 520 (i.e., before the clamp members 514, 514 are completely closed). And after the bending guides 520 have been opened, the clamp members 514, 514 are completely closed. Thereafter, as shown in FIG. 57(A), the clamp members 514, 514 wait being opened.

After the clamp members 514, 514 return to the waiting state shown in FIG. 57(A), the rollers 515, 515 reverse to return the sheets S, and thereafter the rollers 515, 515 move away from each other to wait as shown in FIG. 56. The clipped sheets S are discharged onto a discharge tray by means of a roller (not shown).

Figure 60:
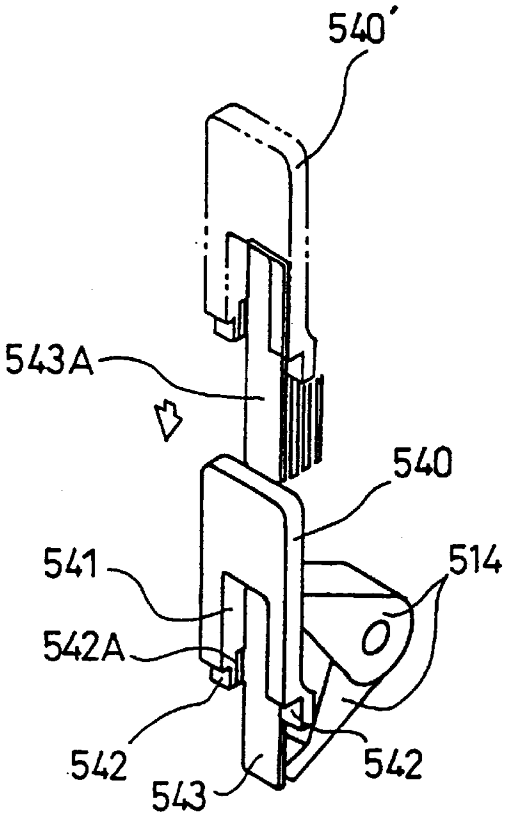
FIG. 60(A) is a descriptive drawing showing a variation of the slider.
FIG. 60(B) is a side view of the slider.
Figure 60:
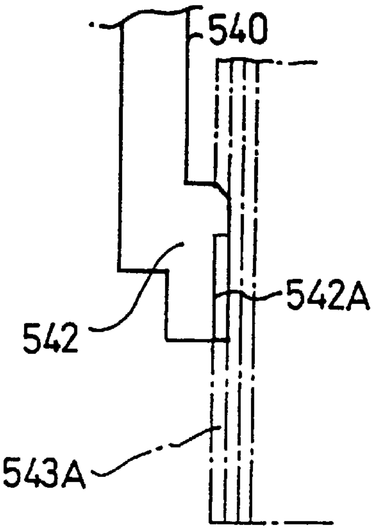
Figure 61:
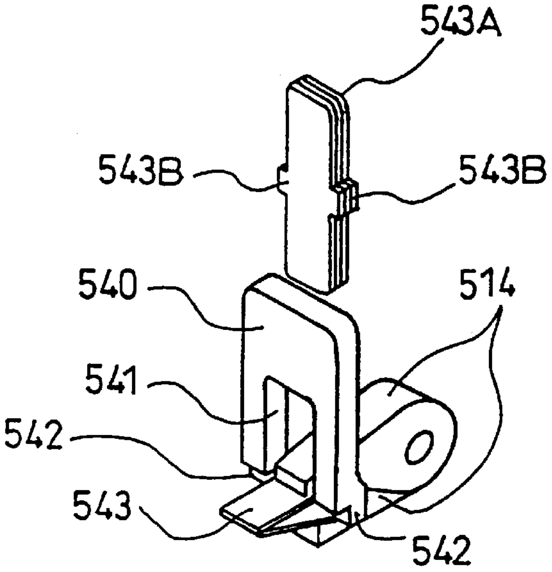
FIG. 61 is a descriptive drawing showing the clipping member bent by the clamping member.

FIGS. 60(A), 60(B), and 61 show modifications of the slider 519 and the clipping member 517. Sliders 540 shown in FIGS. 60(A), 60(B), and 61 serve as auxiliary means for aiding a bending operation performed by the clamp members 514, 514.

A square-shaped notch 541 having a slightly larger width than that of a clipping member 543 is formed in the slider 540, and projecting portions 542 which project downward on right and left sides of the notch 541 are formed in the lower part of the slider 540. A hook groove 542A is formed in the reverse side of each projecting portion 542.

Hook projections 543B, 543B are formed on the right and left edge sides in the middle of the clipping member 543. The hook grooves 542A of the projecting portions 542 of the slider 540 are engaged with the hook projections 543B, 543B of the clipping member 543, and thus the clipping member 543 is pulled out of the cartridge 518.

When the clamp members 514, 514 are closed in a state where the hook projections 543B, 543B of the clipping member 543 are engaged with the projecting portions 542 of the slider 540 in a bending operation of the clipping member 543, the clipping member 543 can be bent as shown in FIG. 61.

According to this embodiment, since the clipping members 517, 543 are delivered in a direction in which the opening and closing movement of the clamp members 514, 514 are made, the width (in a direction perpendicular to the sheet of paper in FIG. 58) of the clipping apparatus 510 can be made narrower. Therefore, the clipping apparatus 510 is more easily installed inside of a copying machine body, a FAX machine body, or the like, and the copying machine body or the FAX machine body can be made smaller-sized.

Additionally, since the clipping members 517, 543 are delivered in the direction in which the clamp members 514, 514 are opened and closed, the cartridge 518 does not hinder when the sheets S of copying paper are delivered toward the part between the clamp members 514, 514. Therefore, the sheets S can be clipped in any position on the end thereof.

Additionally, when the clipping member 517 and the sheets S are allowed to relatively approach each other, the end of the sheets S can be positioned in the inner part of a bent portion of the clipping member 517. Therefore, the clipping force of the clipping member 517 can be enlarged, and, in addition, there can be avoided the disadvantage that, for example, the bent part of the clipping member 517 projects from the end of the sheets S of copying paper and is liable to catch on something.

Embodiment 5

Figure 62:
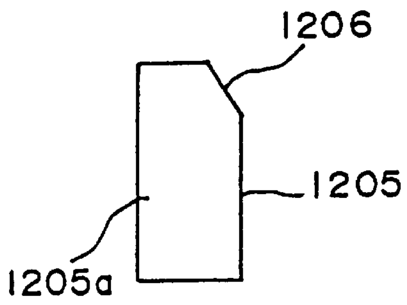
FIG. 62(A) is a front view of another clipping plate.
FIG. 62(B) is a descriptive drawing showing a method of forming the clipping plate.
FIG. 62(C) is a descriptive drawing showing the clipping plate in FIG. 62(A) which has been bent.
Figure 62:
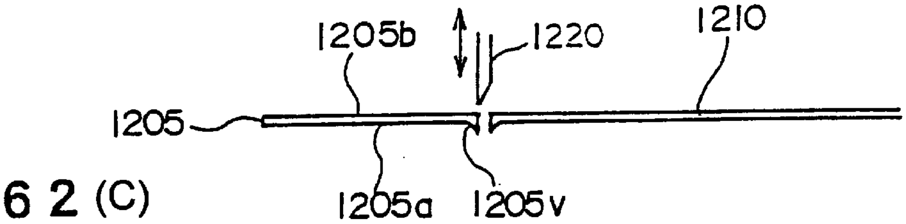
Figure 62:
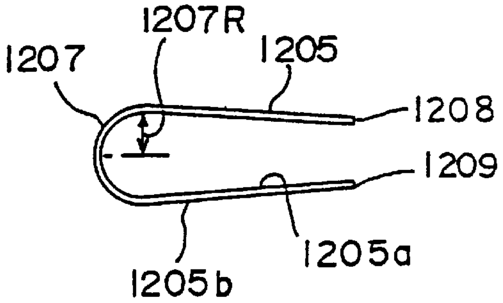
Figure 63:
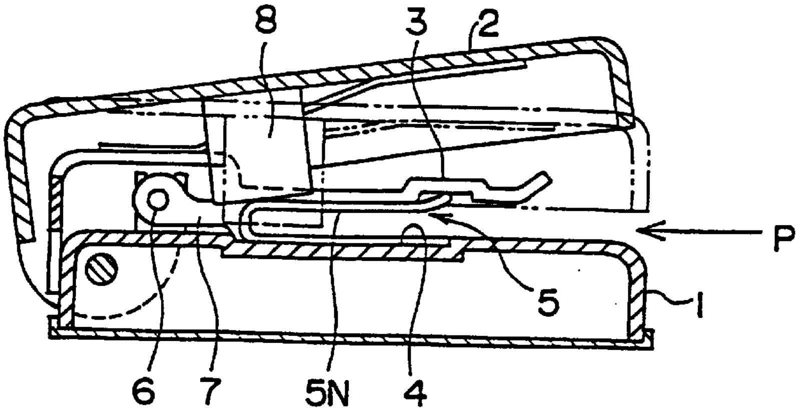
FIG. 63 is a sectional view of a conventional clipping apparatus.
Figure 64:
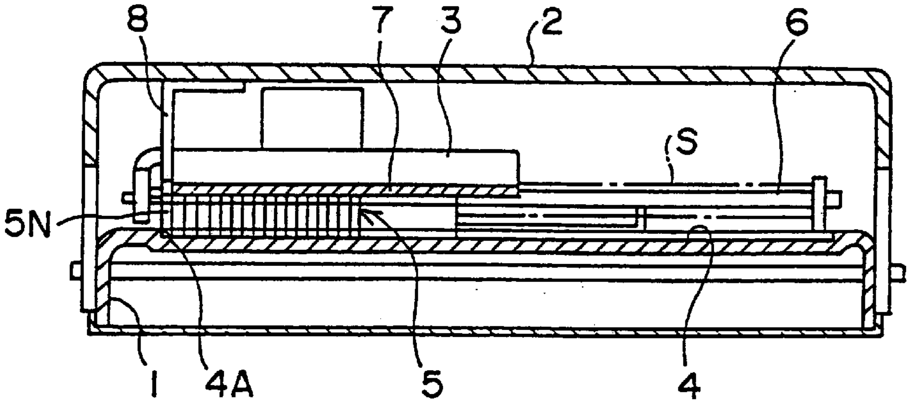
FIG. 64 is a sectional view of the conventional clipping apparatus, showing a general construction thereof.
Figure 65:
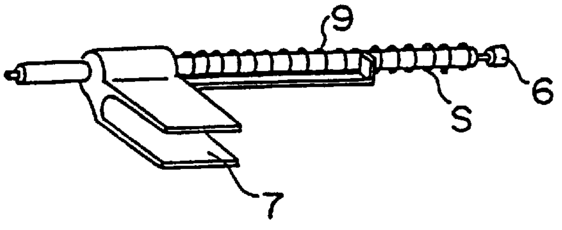
FIG. 65 is a descriptive drawing showing a metallic member and a pressing rod in FIG. 63.

FIG. 62(A) shows a clipping member 1205 according to another embodiment. A cutout portion 1206 is formed at one of the four corners of the clipping member 1205 so that a surface 1205*a* of the clipping member 1205 can be disposed toward the front end of the cartridge 100 when the clipping member 1205 is disposed in the cartridge 100.

When a plate 1210 is cut at intervals of a predetermined length into the clipping members 1205 by means of a cutter 1220, as shown in FIG. 62(B), a burr 1205*v* is generated in the under surface (the right side) 1205*a* of the clipping member 1205, and thus the cut end of an upper surface (a reverse side) 1205*b* is slightly curved. Therefore, when the right side 1205*a* of the clipping member 1205 is disposed to face the front end of the cartridge 100, a state is reached in which the right side 1205*a* of the clipping member 1205 seizes the sheets S therebetween. Therefore, the sheets S can be more tightly fastened with the clipping member 1205. Further, when the clipping member 1205 is picked out of the cartridge 100, the clipping member 1205 is smoothly picked out of the open space 110 of the cartridge 100 without being hooked by the open space 110 because the end of the reverse side 1205*b* of the clipping member 1205 is slightly bent.

Further, as shown in FIG. 62(C), when the clipping member 1205 is bent with the clamp members 51, 52 (see FIG. 25), a radius 1207R of a bent portion 1207 of the clipping member 1205 is enlarged, and the holding force of the sheets S at ends 1208, 1209 is also enlarged because the flexural rigidity of the end part having the cutout portion 1206 of the clipping member 1205 is lower than the middle part thereof. If the bent portion 1207 is flattened, the holding force of the sheets S will be increased because the sheets S are held by the surfaces of the clipping member 1205.

Further, in a case where the held sheets S are released from the clipping member 1205 and then the sheets S are fastened again with the clipping member 1205, the sheets S can be inserted more easily between the ends 1208, 1209 of the clipping member 1205 because the edges of the clipping member 1205 are not in a coincident state at the cutout portion 1206 of the clipping member 1205.

As described above, according to the present invention, a containing chamber can contain many clipping members even though a clipping member is large in width, and therefore it is not required to supply clipping members frequently.

What is claimed is:

1. A clipping apparatus wherein a substantially flat clipping member is taken out of a containing chamber containing a plurality of substantially flat clipping members arranged in a pile by delivery means and is delivered to a clipping position where a clipping operation is performed, the clipping member delivered to the clipping position is then bent by clamping means, and an end of a sheaf of sheets inserted in the clipping position is clipped, said clipping apparatus comprising:

driving means for driving said delivery means;

a driving cam for actuating said clamping means, said driving cam rotating correspondingly to operation of said driving means; and sheet-thickness adjusting means for preventing said driving cam from stopping rotation when said clamping means stops a closing operation in the midst of the closing operation because of the sheaf of sheets being too thick.

2. A clipping apparatus according to claim 1, wherein said clamping means comprises:

a clamp member performing an opening and closing movement;

a clamp pivoting member of which a pivotal movement causes the opening and closing movement of said clamp member; and a cam floor coming into contact with a circumferential surface of said driving cam and pivoting said clamp pivoting member by rotation of said driving cam; and said sheet-thickness adjusting means moves said cam floor relatively with respect to said clamp pivoting member when said clamp member stops the closing movement in the midst of the closing movement because of the sheaf of sheets being too thick.

3. A clipping apparatus according to claim 1 or 2, wherein said delivery means is provided with a detecting member for detecting whether there is the clipping member in said containing chamber.

4. A clipping apparatus wherein a substantially flat clipping member is taken out of a containing chamber containing a plurality of substantially flat clipping members arranged in a pile by delivery means and is delivered to a clipping position where a clipping operation is performed, the clipping member delivered to the clipping position is then bent by clamping means, and an end of a sheaf of sheets inserted in the clipping position is clipped, wherein said delivery means comprises:

a slider for delivering the clipping member to the clipping position in a state of being in contact with a middle part of a front surface of the clipping member;

stopping means for keeping said slider stopped temporarily at the clipping position when the clipping member is delivered to the clipping position by means of said slider; and retreating means for allowing said slider to retreat from the clipping position when the clipping member begins to be bent by said clamping means;

said clamping means comprises a pair of clamping members for pressing and bending the clipping member against said slider while holding both ends of the clipping member delivered to the clipping position and performing a closing operation when said slider is temporarily stopped in the clipping position by said stopping means; and said pair of clamping members further bend the clipping member under the closing operation and clip the end of the sheaf of sheets when said slider is allowed to retreat from the clipping position by said retreating means.

5. A clipping apparatus according to claim 4, wherein said pair of clamping members slightly perform an opening operation when the clipping member is slightly bent, thereafter said retreating means allows said slider to retreat from the clipping position, and thereafter said pair of clamping members bend the clipping member under the closing operation.

6. A clipping apparatus comprising:

a containing chamber for containing a plurality of substantially flat clipping members arranged in a pile;

delivery means for taking out of said containing chamber one of the clipping members contained in said containing chamber and delivering the clipping member to a clipping position where a clipping operation is performed; and clamping means for bending the clipping member delivered to the clipping position and clipping an end of a sheet member inserted in the clipping position, wherein said clamping means comprises a pair of clamping members facing each other, said pair of clamping members performing an opening and closing operation;

said pair of clamping members having projections formed on ends of said pair of clamping members, respectively, said projections projecting toward each other for hooking an end of the clipping member;

swaying members are attached to said pair of clamping members, respectively, said swaying members each having a flat pressing surface for pressing the clipping member and each being swayably disposed in a position where the pressing surface is lower in level than the projection and is behind the projection; and said swaying members sway and thereby a front end of the pressing surface of the swaying member protrudes to be equal in height to the projection when the clipping member is bent by said clamping members and an end of the sheet member is clipped.

7. A clipping apparatus according to claim 6, wherein a center on which the swaying member sways is located between the front end of the pressing surface of the swaying member and a rear end thereof.

8. A clipping apparatus according to claim 6, wherein clamping surfaces facing each other of said pair of clamping members each have a convex in the vicinity of a bent part of the clipping member formed when the clipping member is bent, and the pressing surface of the swaying member is swayed centering said convex.

* * * * *